(12) United States Patent
Li

(10) Patent No.: US 10,439,764 B2
(45) Date of Patent: Oct. 8, 2019

(54) METHOD AND APPARATUS FOR DETERMINING REPETITION QUANTITY OF DOWNLINK CONTROL CHANNEL

(71) Applicant: Huawei Technologies Co., Ltd., Shenzhen (CN)

(72) Inventor: Zhongfeng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 15/277,788

(22) Filed: Sep. 27, 2016

(65) Prior Publication Data

US 2017/0019216 A1    Jan. 19, 2017

Related U.S. Application Data

(63) Continuation of application No. PCT/CN2014/074254, filed on Mar. 28, 2014.

(51) Int. Cl.
*H04L 1/08* (2006.01)
*H04W 4/70* (2018.01)
(Continued)

(52) U.S. Cl.
CPC .............. *H04L 1/08* (2013.01); *H04L 1/0072* (2013.01); *H04W 4/70* (2018.02); *H04W 72/042* (2013.01); *H04L 1/1829* (2013.01)

(58) Field of Classification Search
CPC ................................ H04L 1/00; H04W 72/00
See application file for complete search history.

(56) References Cited

U.S. PATENT DOCUMENTS

2012/0087314 A1* 4/2012 Maeda ............... H04L 5/001
370/328
2012/0127907 A1   5/2012 Gou et al.
(Continued)

FOREIGN PATENT DOCUMENTS

CN        101925107 A      12/2010
CN        101969604 A       2/2011
(Continued)

OTHER PUBLICATIONS

ETSI TS 136 212 v11.2.0 (Apr. 2013) (Year: 2013).*
(Continued)

*Primary Examiner* — Andrew Lai
*Assistant Examiner* — Sumitra Ganguly
(74) *Attorney, Agent, or Firm* — Leydig, Voit & Mayer, Ltd.

(57) ABSTRACT

Embodiments of the present invention provide a method and an apparatus for determining a repetition quantity of a downlink control channel, which relate to the radio communications field. The method includes: acquiring processing information corresponding to a repetition quantity of a downlink control channel; and sending the downlink control channel to user equipment UE according to the processing information, where the downlink control channel is used to carry processed downlink control information, so that the UE determines the repetition quantity of the downlink control channel according to the processing information. The apparatus includes a first acquisition module and a sending module. In the present invention, a repetition quantity sent by a network side is the same as a repetition quantity detected by UE.

12 Claims, 9 Drawing Sheets

(51) Int. Cl.
H04L 1/00 (2006.01)
H04W 72/04 (2009.01)
H04L 1/18 (2006.01)

(56) References Cited

U.S. PATENT DOCUMENTS

| | | | |
|---|---|---|---|
| 2013/0163543 | A1 | 6/2013 | Freda et al. |
| 2013/0286960 | A1 | 10/2013 | Li et al. |
| 2015/0181576 | A1* | 6/2015 | Papasakellariou .... H04L 5/0053 370/329 |
| 2016/0182213 | A1* | 6/2016 | Golitschek Edler von Elbwart ............... H04L 1/1854 370/294 |
| 2017/0295577 | A1 | 10/2017 | Nishio et al. |

FOREIGN PATENT DOCUMENTS

| | | |
|---|---|---|
| CN | 102255688 A | 11/2011 |
| EP | 2466977 A1 | 6/2012 |
| JP | 2009130904 A | 6/2009 |
| JP | 2009290451 A | 12/2009 |
| WO | 2011021379 A1 | 2/2011 |
| WO | WO 2013096928 A1 | 6/2013 |

OTHER PUBLICATIONS

"PDCCH coverage enhancement for MTC," 3GPP TSG RAN WG1 Meeting #74bis, Guangzhou, China, R1-134395, 3rd Generation Partnership Project, Valbonne, France (Oct. 7-11, 2013).

"Coverage enhancement for RACH messages," 3GPP TSG-RAN WG1 Meeting #76, Prague, Czech Republic, R1-140153, 3rd Generation Partnership Project, Valbonne, France (Feb. 10-14, 2014).

"RACH procedure for MTC coverage enhancement," 3GPP TSG RAN WG1 #76, Prague, Czech Republic, R1-140305, 3rd Generation Partnership Project, Valbonne, France (Feb. 10-14, 2014).

"PDCCH Coverage Enhancements for MTC UEs," 3GPP TSG RAN WG1 #76, Prague, Czech Republic, R1-140356, pp. 1-3, $3^{rd}$ Generation Partnership Project, Valbonne, France (Feb. 10-14, 2014).

"PDSCH/PUSCH Coverage Enhancements for MTC UEs," 3GPP TSG RAN WG1 #76, Prague, Czech Republic, R1-140358, pp. 1-3, $3^{rd}$ Generation Partnership Project, Valbonne, France (Feb. 10-14, 2014).

"Way Forward on PDCCH/PDSCH timing for MTC enhanced coverage," 3GPP TSG RAN WG1 #75, San Francisco, USA, R1-135945, pp. 1-2, $3^{rd}$ Generation Partnership Project, Valbonne, France (Nov. 11-15, 2013).

$3^{rd}$ Generation Partnership Project; Technical Specification Group Radio Access Network; Evolved Universal Terrestrial Radio Access (E-UTRA); Multiplexing and channel coding (Release 12), 3GPP TS 36.212, V12.0.0, pp. 1-88, $3^{rd}$ Generation Partnership Project, Valbonne, France (Dec. 2013).

"Method for saving battery power in monitoring PDCCH of enhanced coverage MTC UE," 3GPP TSG-RAN WG1 Meeting #76, Prague, Czech Republic, R1-140484, 3rd Generation Partnership Project, Valbonne, France (Feb. 10-14, 2014).

* cited by examiner

METHOD AND APPARATUS FOR DETERMINING REPETITION QUANTITY OF DOWNLINK CONTROL CHANNEL

CROSS-REFERENCE TO RELATED APPLICATIONS

This application is a continuation of International Application No. PCT/CN2014/074254, filed on Mar. 28, 2014, the disclosure of which is hereby incorporated by reference in its entirety.

TECHNICAL FIELD

The present invention relates to the radio communications field, and in particular, to a method and an apparatus for determining a repetition quantity of a downlink control channel.

BACKGROUND

In a radio communications system, M2M (machine to machine) is widely applied because M2M communication can greatly reduce communication costs. The M2M may be used in scenarios such as meter reading, geological survey, environment monitoring, and tracking. In addition, the M2M can be deployed not only in an outdoor open area but also in a place such as a basement that is blocked by a building or has a relatively large penetration loss. When the M2M is deployed in a place such as a basement that is blocked by a building or has a relatively large penetration loss, network coverage is relatively poor, and therefore, received energy of a channel may be enhanced by repeatedly sending the channel, so as to improve the network coverage of the M2M.

The channel includes a control channel and a data channel, and the control channel includes an uplink control channel and a downlink control channel. The downlink control channel is used to carry downlink control information sent to UE (user equipment), and the UE may communicate with a network side according to the downlink control information. When the downlink control channel is repeatedly sent, the UE needs to determine a repetition quantity of the downlink control channel, and acquire, according to the repetition quantity of the downlink control channel, the downlink control information carried on the repeatedly sent downlink control channel. Currently, the network side sends a downlink control channel to the UE according to a preset repetition level. The UE receives the downlink control channel sent by the network side and, according to the preset repetition level by blindly detecting the repeatedly transmitted downlink control channel, determines the repetition level and further determines the repetition quantity.

Because multiple repetition levels may be set for one downlink control channel, the network side may switch a repetition level at any time to send a downlink control channel to the UE. When the network side switches from a first repetition level to a second repetition level, the UE still uses the first repetition level to detect a repeatedly transmitted downlink control channel. If the detection succeeds, a repetition quantity detected by the UE is different from a repetition quantity actually sent by the network side. Because a time interval between a data channel and a downlink control channel is fixed, the UE cannot successfully receive the data channel after the detection succeeds, which causes a waste of resources. When the data channel cannot be received, the UE feeds back an ACK/NACK (acknowledgment/negative acknowledgment) message to the network side. Because the UE needs to occupy an uplink control channel when feeding back the ACK/NACK message to the network side, and in this case, the network side does not allocate the uplink control channel to the UE, an uplink control channel of another UE may be interfered by the UE. In addition, when the UE cannot successfully receive the data channel, the UE continues to detect the data channel, which increases power consumption of the UE.

SUMMARY

Embodiments of the present invention provide a method and an apparatus for determining a repetition quantity of a downlink control channel. The technical solutions are as follows:

According to a first aspect, an apparatus for determining a repetition quantity of a downlink control channel is provided, where the apparatus includes:

a first acquisition module, configured to acquire processing information corresponding to a repetition quantity of a downlink control channel; and a sending module, configured to send the downlink control channel to user equipment UE according to the processing information, where the downlink control channel is used to carry processed downlink control information, so that the UE determines the repetition quantity of the downlink control channel according to the processing information.

With reference to the first aspect, in a first possible implementation manner of the first aspect, the first acquisition module includes:

a first acquisition unit, configured to acquire a corresponding mask according to the repetition quantity of the downlink control channel.

With reference to the first possible implementation manner of the first aspect, in a second possible implementation manner of the first aspect, the sending module includes:

a serial connection unit, configured to connect, in series behind downlink control information carried on the downlink control channel, a cyclic redundancy check code CRC bit corresponding to the downlink control information to obtain a bit sequence;

a first scrambling unit, configured to perform, according to the mask and a radio network temporary identifier RNTI of the UE, scrambling on the CRC bit corresponding to the downlink control information carried on the downlink control channel, to obtain the processed downlink control information; and a first sending unit, configured to: add the processed downlink control information to the downlink control channel, and send the downlink control channel to the UE.

With reference to the second possible implementation manner of the first aspect, in a third possible implementation manner of the first aspect, the apparatus further includes:

a second acquisition module, configured to acquire an antenna selection mask when antenna selection is configured; where correspondingly, the first scrambling unit is specifically configured to:

perform, according to the mask, the antenna selection mask, and the RNTI, scrambling on the CRC bit corresponding to the downlink control information carried on the downlink control channel, to obtain the processed downlink control information.

With reference to the first aspect, in a fourth possible implementation manner of the first aspect, the first acquisition module includes:

a second acquisition unit, configured to acquire a scrambling initialization parameter corresponding to the repetition quantity of the downlink control channel;

a third acquisition unit, configured to acquire a number of a timeslot in which the downlink control channel is currently located and an identity ID value acquired by a network side; and an initialization unit, configured to initialize a sequence generator according to the scrambling initialization parameter, the number of the timeslot in which the downlink control channel is currently located, and the ID value acquired by the network side, so that the sequence generator generates a scrambling sequence.

With reference to the first aspect, in a fifth possible implementation manner of the first aspect, the apparatus further includes:

a serial connection module, configured to connect a CRC bit in series behind downlink control information to obtain a bit sequence;

a channel coding module, configured to perform channel coding on the bit sequence to obtain a coded block; and a rate matching module, configured to perform rate matching processing on the coded block to obtain a rate matching bit.

With reference to the fourth possible implementation manner of the first aspect or the fifth possible implementation manner of the first aspect, in a sixth possible implementation manner of the first aspect, the sending module includes:

a second scrambling unit, configured to perform scrambling on the rate matching bit according to the scrambling sequence generated by the sequence generator, to obtain the processed downlink control information; and a second sending unit, configured to: add the processed downlink control information to the downlink control channel, and send the downlink control channel to the UE.

With reference to the fifth possible implementation manner of the first aspect, in a seventh possible implementation manner of the first aspect, the apparatus further includes:

a modulation module, configured to perform scrambling and modulation on the rate matching bit to obtain a modulation symbol; where correspondingly, the sending module includes:

a multiplying unit, configured to multiply, bit by bit, the modulation symbol and a scrambling sequence corresponding to the repetition quantity, to obtain the processed downlink control information; and a third sending unit, configured to: add the processed downlink control information to the downlink control channel, and send the downlink control channel to the UE.

With reference to the first aspect, in an eighth possible implementation manner of the first aspect, the first acquisition module includes:

a fourth acquisition unit, configured to acquire an indication bit for the repetition quantity of the downlink control channel; and a setting unit, configured to set the indication bit according to the repetition quantity of the downlink control channel, so as to indicate the repetition quantity.

With reference to the eighth possible implementation manner of the first aspect, in a ninth possible implementation manner of the first aspect, the indication bit is a newly added bit or an existing bit.

With reference to the first aspect, in a tenth possible implementation manner of the first aspect, the first acquisition module includes:

a fifth acquisition unit, configured to acquire a frequency domain resource corresponding to the repetition quantity, where the frequency domain resource is a candidate location or search space of the control channel.

With reference to the tenth possible implementation manner of the first aspect, in an eleventh possible implementation manner of the first aspect, the sending module includes:

an adding unit, configured to: add the downlink control information to the downlink control channel, and add the downlink control channel to the frequency domain resource; and a fourth sending unit, configured to send the downlink control channel to the UE on the frequency domain resource.

With reference to the first aspect, in a twelfth possible implementation manner of the first aspect, the sending module includes:

a fifth sending unit, configured to send a configuration signaling message to the UE, so that the UE determines, according to the configuration signaling message, the repetition quantity that is after a preset effective time; and a sixth sending unit, configured to: add the downlink control information to the downlink control channel according to the repetition quantity, and send the downlink control channel to the UE after the preset effective time expires.

With reference to the twelfth possible implementation manner of the first aspect, in a thirteenth possible implementation manner of the first aspect, the configuration signaling message is a radio resource control RRC message or a media access control element MAC CE message.

With reference to the first aspect, in a fourteenth possible implementation manner of the first aspect, the first acquisition module includes:

a sixth acquisition unit, configured to acquire, according to the repetition quantity of the downlink control channel, a subframe set corresponding to the repetition quantity.

With reference to the fourteenth possible implementation manner of the first aspect, in a fifteenth possible implementation manner of the first aspect, the sending module includes:

a seventh sending unit, configured to: in the subframe set corresponding to the repetition quantity, add the downlink control information to the downlink control channel, and send the downlink control channel to the UE.

With reference to the fourteenth possible implementation manner of the first aspect or the fifteenth possible implementation manner of the first aspect, in a sixteenth possible implementation manner of the first aspect, subframe sets corresponding to multiple repetition quantities include at least one non-overlapping subframe.

With reference to the first aspect and any one of the first to the sixteenth possible implementation manners of the first aspect, in a seventeenth possible implementation manner of the first aspect, the apparatus further includes:

a configuration module, configured to: configure a correspondence between the repetition quantity of the downlink control channel and a repetition quantity of a data channel; and send, to the UE, the correspondence between the repetition quantity of the downlink control channel and the repetition quantity of the data channel; or a presetting module, configured to preset a correspondence between the repetition quantity of the downlink control channel and a repetition quantity of a data channel.

With reference to the seventeenth possible implementation manner of the first aspect, in an eighteenth possible implementation manner of the first aspect, the apparatus further includes:

a third acquisition module, configured to acquire the repetition quantity of the corresponding data channel according to the repetition quantity of the downlink control channel from the correspondence between the repetition quantity of the downlink control channel and the repetition quantity of the data channel; and a first sending or receiving module, configured to: according to the repetition quantity of the data channel, send a downlink data channel or receive an uplink data channel.

According to a second aspect, an apparatus for determining a repetition quantity of a downlink control channel is provided, where the apparatus includes:

a first receiving module, configured to receive the downlink control channel, where the downlink control channel is used to carry processed downlink control information, and the downlink control information is sent by a network side according to processing information corresponding to a repetition quantity of the downlink control channel; and a determining module, configured to determine the repetition quantity of the downlink control channel according to the downlink control channel.

With reference to the second aspect, in a first possible implementation manner of the second aspect, the determining module includes:

a descrambling unit, configured to: for any repetition quantity in multiple stored repetition quantities, perform, according to a scrambling sequence corresponding to the repetition quantity, descrambling on the processed downlink control information carried on the downlink control channel;

a verification unit, configured to perform verification on descrambled downlink control information according to a cyclic redundancy check CRC bit corresponding to downlink control information carried on the downlink control channel; and a first determining unit, configured to: if the verification succeeds, determine the repetition quantity as the repetition quantity of the downlink control channel.

With reference to the first possible implementation manner of the second aspect, in a second possible implementation manner of the second aspect, the descrambling unit includes:

an acquiring subunit, configured to acquire a scrambled CRC bit from the processed downlink control information carried on the downlink control channel; and a first descrambling subunit, configured to perform, according to a mask corresponding to the repetition quantity and a radio network temporary identifier RNTI of user equipment UE, descrambling on the scrambled CRC bit in the processed downlink control information carried on the downlink control channel.

With reference to the second possible implementation manner of the second aspect, in a third possible implementation manner of the second aspect, when antenna selection is configured, the descrambling unit includes:

a second descrambling subunit, configured to perform, according to the mask corresponding to the repetition quantity, an antenna selection mask, and the RNTI, descrambling on the scrambled CRC bit in the processed downlink control information carried on the downlink control channel.

With reference to the first possible implementation manner of the second aspect, in a fourth possible implementation manner of the second aspect, the descrambling unit includes:

an initialization subunit, configured to initialize a sequence generator according to a scrambling initialization parameter corresponding to the repetition quantity, a number of a timeslot in which the downlink control channel is currently located, and an identity ID value acquired by the UE, so that the sequence generator generates a scrambling sequence; and a third descrambling subunit, configured to perform, according to the scrambling sequence generated by the sequence generator, descrambling on the processed downlink control information carried on the downlink control channel.

With reference to the first possible implementation manner of the second aspect, in a fifth possible implementation manner of the second aspect, the descrambling unit includes:

a multiplying subunit, configured to multiply, bit by bit, a symbol corresponding to the processed downlink control information carried on the downlink control channel and the scrambling sequence corresponding to the repetition quantity, to obtain the descrambled downlink control information.

With reference to the second aspect, in a sixth possible implementation manner of the second aspect, the determining module includes:

a seventh acquisition unit, configured to acquire an indication bit in the downlink control information carried on the downlink channel; and a second determining unit, configured to determine the repetition quantity of the downlink control channel according to the indication bit.

With reference to the sixth possible implementation manner of the second aspect, in a seventh possible implementation manner of the second aspect, the indication bit is a newly added bit or an existing bit.

With reference to the second aspect, in a seventh possible implementation manner of the second aspect, the determining module includes:

a first detection unit, configured to: for any repetition quantity in multiple stored repetition quantities, perform detection on the downlink control channel according to a frequency domain resource corresponding to the repetition quantity, where the frequency domain resource is a candidate location or search space of the downlink control channel; and a third determining unit, configured to: if the detection succeeds, determine the repetition quantity as the repetition quantity of the downlink control channel.

With reference to the eighth possible implementation manner of the second aspect, in a ninth possible implementation manner of the second aspect, when different repetition quantities are located in different search spaces, an offset exists between adjacent search spaces.

With reference to the second aspect, in a tenth possible implementation manner of the second aspect, the determining module includes:

a receiving unit, configured to receive a configuration signaling message; and a fourth determining unit, configured to determine that a repetition quantity carried in the configuration signaling message is the repetition quantity that is of the downlink control channel and is after a preset effective time.

With reference to the tenth possible implementation manner of the second aspect, in an eleventh possible implementation manner of the second aspect, the configuration signaling message is a radio resource control RRC message or a media access control element MAC CE message.

With reference to the second aspect, in a twelfth possible implementation manner of the second aspect, the determining module includes:

an eighth acquisition unit, configured to: for any repetition quantity in multiple stored repetition quantities, acquire the corresponding downlink control channel according to a subframe set corresponding to the repetition quantity;

a second detection unit, configured to perform detection on the acquired downlink control channel; and a fifth determining unit, configured to: if the detection succeeds, determine the repetition quantity as the repetition quantity of the downlink control channel.

With reference to the twelfth possible implementation manner of the second aspect, in a thirteenth possible implementation manner of the second aspect, subframe sets corresponding to the multiple repetition quantities include at least one non-overlapping subframe.

With reference to the second aspect and any one of the first to the thirteenth possible implementation manners of the second aspect, in a fourteenth possible implementation manner of the second aspect, the apparatus further includes:

a fourth acquisition module, configured to acquire a repetition quantity of a data channel according to the repetition quantity of the downlink control channel from a stored correspondence between the repetition quantity of the downlink control channel and the repetition quantity of the data channel; and a second sending or receiving module, configured to: according to the repetition quantity of the data channel, send an uplink data channel or receive a downlink data channel.

With reference to the fourteenth possible implementation manner of the second aspect, in a fifteenth possible implementation manner of the second aspect, the apparatus further includes:

the second receiving module, configured to receive the correspondence between the repetition quantity of the downlink control channel and the repetition quantity of the data channel.

According to a third aspect, a method for determining a repetition quantity of a downlink control channel is provided, where the method includes:

acquiring processing information corresponding to a repetition quantity of a downlink control channel; and sending the downlink control channel to user equipment UE according to the processing information, where the downlink control channel is used to carry processed downlink control information, so that the UE determines the repetition quantity of the downlink control channel according to the processing information.

With reference to the third aspect, in a first possible implementation manner of the third aspect, the acquiring processing information corresponding to a repetition quantity of a downlink control channel includes:

acquiring a corresponding mask according to the repetition quantity of the downlink control channel.

With reference to the first possible implementation manner of the third aspect, in a second possible implementation manner of the third aspect, the sending the downlink control channel to user equipment UE according to the processing information includes:

connecting, in series behind downlink control information carried on the downlink control channel, a cyclic redundancy check code CRC bit corresponding to the downlink control information to obtain a bit sequence;

performing, according to the mask and a radio network temporary identifier RNTI of the UE, scrambling on the cyclic redundancy check code CRC bit corresponding to the downlink control information carried on the downlink control channel, to obtain the processed downlink control information;

connecting a scrambled CRC bit in series behind the downlink control information to obtain the processed downlink control information; and adding the processed downlink control information to the downlink control channel, and sending the downlink control channel to the UE.

With reference to the second possible implementation manner of the third aspect, in a third possible implementation manner of the third aspect, the method further includes:

acquiring an antenna selection mask when antenna selection is configured; where correspondingly, the performing, according to the mask and a radio network temporary identifier RNTI of the UE, scrambling on the CRC bit corresponding to the downlink control information carried on the downlink control channel, to obtain the processed downlink control information includes:

performing, according to the mask, the antenna selection mask, and the RNTI, scrambling on the CRC bit corresponding to the downlink control information carried on the downlink control channel, to obtain the processed downlink control information.

With reference to the third aspect, in a fourth possible implementation manner of the third aspect, the acquiring processing information corresponding to a repetition quantity of a downlink control channel includes:

acquiring a scrambling initialization parameter corresponding to the repetition quantity of the downlink control channel;

acquiring a number of a timeslot in which the downlink control channel is currently located and an identity ID value acquired by a network side; and initializing a sequence generator according to the scrambling initialization parameter, the number of the timeslot in which the downlink control channel is currently located, and the ID value acquired by the network side, so that the sequence generator generates a scrambling sequence.

With reference to the third aspect, in a fifth possible implementation manner of the third aspect, before the sending the downlink control channel to user equipment UE according to the processing information, the method further includes:

connecting a CRC bit in series behind downlink control information to obtain a bit sequence;

performing channel coding on the bit sequence to obtain a coded block; and performing rate matching processing on the coded block to obtain a rate matching bit.

With reference to the fourth possible implementation manner of the third aspect or the fifth possible implementation manner of the third aspect, in a sixth possible implementation manner of the third aspect, the sending the downlink control channel to user equipment UE according to the processing information includes:

performing scrambling on the rate matching bit according to the scrambling sequence generated by the sequence generator, to obtain the processed downlink control information; and adding the processed downlink control information to the downlink control channel, and sending the downlink control channel to the UE.

With reference to the fifth possible implementation manner of the third aspect, in a seventh possible implementation manner of the third aspect, the method further includes:

performing scrambling and modulation on the rate matching bit to obtain a modulation symbol; where correspondingly, the sending the downlink control channel to user equipment UE according to the processing information includes:

multiplying, bit by bit, the modulation symbol and a scrambling sequence corresponding to the repetition quantity, to obtain the processed downlink control information; and adding the processed downlink control information to the downlink control channel, and sending the downlink control channel to the UE.

With reference to the third aspect, in an eighth possible implementation manner of the third aspect, the acquiring processing information corresponding to a repetition quantity of a downlink control channel includes:

acquiring an indication bit for the repetition quantity of the downlink control channel; and setting the indication bit according to the repetition quantity of the downlink control channel, so as to indicate the repetition quantity.

With reference to the eighth possible implementation manner of the third aspect, in a ninth possible implementation manner of the third aspect, the indication bit is a newly added bit or an existing bit.

With reference to the third aspect, in a tenth possible implementation manner of the third aspect, the acquiring processing information corresponding to a repetition quantity of a downlink control channel includes:

acquiring a frequency domain resource corresponding to the repetition quantity, where the frequency domain resource is a candidate location or search space of the control channel.

With reference to the tenth possible implementation manner of the third aspect, in an eleventh possible implementation manner of the third aspect, the sending the downlink control channel to user equipment UE according to the processing information includes:

adding the downlink control information to the downlink control channel, and adding the downlink control channel to the frequency domain resource; and sending the downlink control channel to the UE on the frequency domain resource.

With reference to the third aspect, in a twelfth possible implementation manner of the third aspect, the sending the downlink control channel to user equipment UE according to the processing information includes:

sending a configuration signaling message to the UE, so that the UE determines, according to the configuration signaling message, the repetition quantity that is after a preset effective time; and adding the downlink control information to the downlink control channel according to the repetition quantity, and sending the downlink control channel to the UE after the preset effective time expires.

With reference to the twelfth possible implementation manner of the third aspect, in a thirteenth possible implementation manner of the third aspect, the configuration signaling message is a radio resource control RRC message or a media access control element MAC CE message.

With reference to the third aspect, in a fourteenth possible implementation manner of the third aspect, the acquiring processing information corresponding to a repetition quantity of a downlink control channel includes:

acquiring, according to the repetition quantity of the downlink control channel, a subframe set corresponding to the repetition quantity.

With reference to the fourteenth possible implementation manner of the third aspect, in a fifteenth possible implementation manner of the third aspect, the sending the downlink control channel to user equipment UE according to the processing information includes:

in the subframe set corresponding to the repetition quantity, adding the downlink control information to the downlink control channel, and sending the downlink control channel to the UE.

With reference to the fourteenth possible implementation manner of the third aspect or the fifteenth possible implementation manner of the third aspect, in a sixteenth possible implementation manner of the third aspect, subframe sets corresponding to multiple repetition quantities include at least one non-overlapping subframe.

With reference to the third aspect and any one of the first to the sixteenth possible implementation manners of the third aspect, in a seventeenth possible implementation manner of the third aspect, the method further includes:

configuring a correspondence between the repetition quantity of the downlink control channel and a repetition quantity of a data channel, and sending, to the UE, the correspondence between the repetition quantity of the downlink control channel and the repetition quantity of the data channel; or presetting a correspondence between the repetition quantity of the downlink control channel and a repetition quantity of a data channel.

With reference to the seventeenth possible implementation manner of the third aspect, in an eighteenth possible implementation manner of the third aspect, the method further includes:

acquiring the repetition quantity of the corresponding data channel according to the repetition quantity of the downlink control channel from the correspondence between the repetition quantity of the downlink control channel and the repetition quantity of the data channel; and according to the repetition quantity of the data channel, sending a downlink data channel or receiving an uplink data channel.

According to a fourth aspect, a method for determining a repetition quantity of a downlink control channel is provided, where the method includes:

receiving the downlink control channel, where the downlink control channel is used to carry processed downlink control information, and the downlink control information is sent by a network side according to processing information corresponding to a repetition quantity of the downlink control channel; and determining the repetition quantity of the downlink control channel according to the downlink control channel.

With reference to the fourth aspect, in a first possible implementation manner of the fourth aspect, the determining the repetition quantity of the downlink control channel according to the downlink control channel includes:

for any repetition quantity in multiple stored repetition quantities, performing, according to a scrambling sequence corresponding to the repetition quantity, descrambling on the processed downlink control information carried on the downlink control channel;

performing verification on descrambled downlink control information according to a cyclic redundancy check CRC bit corresponding to downlink control information carried on the downlink control channel; and if the verification succeeds, determining the repetition quantity as the repetition quantity of the downlink control channel.

With reference to the first possible implementation manner of the fourth aspect, in a second possible implementation manner of the fourth aspect, the performing, according to a scrambling sequence corresponding to the repetition quantity, descrambling on the processed downlink control information carried on the downlink control channel includes:

performing, according to a mask corresponding to the repetition quantity and a radio network temporary identifier RNTI of user equipment UE, descrambling on a scrambled CRC bit in the processed downlink control information carried on the downlink control channel.

With reference to the second possible implementation manner of the fourth aspect, in a third possible implementation manner of the fourth aspect, when antenna selection is configured, the performing, according to a mask corresponding to the repetition quantity and a radio network temporary identifier RNTI of user equipment UE, descrambling on a scrambled CRC bit in the processed downlink control information carried on the downlink control channel includes:

performing, according to the mask corresponding to the repetition quantity, an antenna selection mask, and the RNTI, descrambling on the scrambled CRC bit in the processed downlink control information carried on the downlink control channel.

With reference to the first possible implementation manner of the fourth aspect, in a fourth possible implementation manner of the fourth aspect, the performing, according to a scrambling sequence corresponding to the repetition quantity, descrambling on the processed downlink control information carried on the downlink control channel includes:

initializing a sequence generator according to a scrambling initialization parameter corresponding to the repetition quantity, a number of a timeslot in which the downlink control channel is currently located, and an identity ID value acquired by the UE, so that the sequence generator generates a scrambling sequence; and performing, according to the scrambling sequence generated by the sequence generator, descrambling on the processed downlink control information carried on the downlink control channel.

With reference to the first possible implementation manner of the fourth aspect, in a fifth possible implementation manner of the fourth aspect, the performing, according to a scrambling sequence corresponding to the repetition quantity, descrambling on the processed downlink control information carried on the downlink control channel includes:

multiplying, bit by bit, a symbol corresponding to the processed downlink control information carried on the downlink control channel and the scrambling sequence corresponding to the repetition quantity, to obtain the descrambled downlink control information.

With reference to the fourth aspect, in a sixth possible implementation manner of the fourth aspect, the determining the repetition quantity of the downlink control channel according to the downlink control channel includes:

acquiring an indication bit in the downlink control information carried on the downlink channel; and
determining the repetition quantity of the downlink control channel according to the indication bit.

With reference to the sixth possible implementation manner of the fourth aspect, in a seventh possible implementation manner of the fourth aspect, the indication bit is a newly added bit or an existing bit.

With reference to the fourth aspect, in a seventh possible implementation manner of the fourth aspect, the determining the repetition quantity of the downlink control channel according to the downlink control channel includes:

for any repetition quantity in multiple stored repetition quantities, performing detection on the downlink control channel according to a frequency domain resource corresponding to the repetition quantity, where the frequency domain resource is a candidate location or search space of the downlink control channel; and
if the detection succeeds, determining the repetition quantity as the repetition quantity of the downlink control channel.

With reference to the eighth possible implementation manner of the fourth aspect, in a ninth possible implementation manner of the fourth aspect, when different repetition quantities are located in different search spaces, an offset exists between adjacent search spaces.

With reference to the fourth aspect, in a tenth possible implementation manner of the fourth aspect, the determining the repetition quantity of the downlink control channel according to the downlink control channel includes:

receiving a configuration signaling message; and
determining that a repetition quantity carried in the configuration signaling message is the repetition quantity that is of the downlink control channel and is after a preset effective time.

With reference to the tenth possible implementation manner of the fourth aspect, in an eleventh possible implementation manner of the fourth aspect, the configuration signaling message is a radio resource control RRC message or a media access control element MAC CE message.

With reference to the fourth aspect, in a twelfth possible implementation manner of the fourth aspect, the determining the repetition quantity of the downlink control channel according to the downlink control channel includes:

for any repetition quantity in multiple stored repetition quantities, acquiring the corresponding downlink control channel according to a subframe set corresponding to the repetition quantity;
performing detection on the acquired downlink control channel; and
if the detection succeeds, determining the repetition quantity as the repetition quantity of the downlink control channel.

With reference to the twelfth possible implementation manner of the fourth aspect, in a thirteenth possible implementation manner of the fourth aspect, subframe sets corresponding to the multiple repetition quantities include at least one non-overlapping subframe.

With reference to the fourth aspect and any one of the first to the thirteenth possible implementation manners of the fourth aspect, in a fourteenth possible implementation manner of the fourth aspect, the method further includes:

acquiring a repetition quantity of a data channel according to the repetition quantity of the downlink control channel from a stored correspondence between the repetition quantity of the downlink control channel and the repetition quantity of the data channel; and
according to the repetition quantity of the data channel, receiving a downlink data channel or sending an uplink data channel.

With reference to the fourteenth possible implementation manner of the fourth aspect, in a fifteenth possible implementation manner of the fourth aspect, before the acquiring a repetition quantity of a data channel according to the repetition quantity of the downlink control channel from a stored correspondence between the repetition quantity of the downlink control channel and the repetition quantity of the data channel, the method further includes:

receiving the correspondence between the repetition quantity of the downlink control channel and the repetition quantity of the data channel.

In the embodiments of the present invention, processing information corresponding to a repetition quantity of a downlink control channel is acquired, and the downlink control channel is sent to UE according to the processing information. According to the received downlink control channel, the UE determines the repetition quantity of the downlink control channel, so that a repetition quantity sent by a network side is the same as a repetition quantity detected by the UE. Therefore, the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
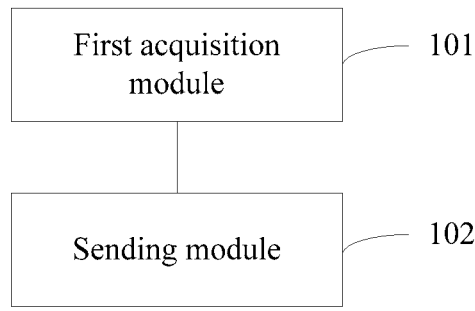
FIG. 1 is a schematic structural diagram of an apparatus for determining a repetition quantity of a downlink control channel according to Embodiment 1 of the present invention.

FIG. 1 is a schematic structural diagram of an apparatus for determining a repetition quantity of a downlink control channel according to an embodiment of the present invention. Referring to FIG. 1, the apparatus includes:

a first acquisition module 101, configured to acquire processing information corresponding to a repetition quantity of a downlink control channel; and a sending module 102, configured to send the downlink control channel to user equipment UE according to the processing information, where the downlink control channel is used to carry processed downlink control information, so that the UE determines the repetition quantity of the downlink control channel according to the processing information.

Optionally, the first acquisition module 101 includes:

a first acquisition unit, configured to acquire a corresponding mask according to the repetition quantity of the downlink control channel.

Optionally, the sending module 102 includes:

a serial connection unit, configured to connect, in series behind downlink control information carried on the downlink control channel, a cyclic redundancy check code CRC bit corresponding to the downlink control information to obtain a bit sequence;

a first scrambling unit, configured to perform, according to the mask and a radio network temporary identifier RNTI of the UE, scrambling on the CRC bit corresponding to the downlink control information carried on the downlink control channel, to obtain the processed downlink control information; and a first sending unit, configured to: add the processed downlink control information to the downlink control channel, and send the downlink control channel to the UE.

Further, the apparatus further includes:

a second acquisition module, configured to acquire an antenna selection mask when antenna selection is configured.

Correspondingly, the first scrambling unit is specifically configured to:

perform, according to the mask, the antenna selection mask, and the RNTI, scrambling on the CRC bit corresponding to the downlink control information carried on the downlink control channel, to obtain the processed downlink control information.

Optionally, the first acquisition module 101 includes:

a second acquisition unit, configured to acquire a scrambling initialization parameter corresponding to the repetition quantity of the downlink control channel;

a third acquisition unit, configured to acquire a number of a timeslot in which the downlink control channel is currently located and an identity ID value acquired by a network side; and an initialization unit, configured to initialize a sequence generator according to the scrambling initialization parameter, the number of the timeslot in which the downlink control channel is currently located, and the ID value acquired by the network side, so that the sequence generator generates a scrambling sequence.

Further, the apparatus further includes:

a serial connection module, configured to connect a CRC bit in series behind downlink control information to obtain a bit sequence;

a channel coding module, configured to perform channel coding on the bit sequence to obtain a coded block; and a rate matching module, configured to perform rate matching processing on the coded block to obtain a rate matching bit.

Optionally, the sending module 102 includes:

a second scrambling unit, configured to perform scrambling on the rate matching bit according to the scrambling sequence generated by the sequence generator, to obtain the processed downlink control information; and a second sending unit, configured to: add the processed downlink control information to the downlink control channel, and send the downlink control channel to the UE.

Further, the apparatus further includes:

a modulation module, configured to perform scrambling and modulation on the rate matching bit to obtain a modulation symbol.

Correspondingly, the sending module 102 includes:

a multiplying unit, configured to multiply, bit by bit, the modulation symbol and a scrambling sequence corresponding to the repetition quantity, to obtain the processed downlink control information; and a third sending unit, configured to: add the processed downlink control information to the downlink control channel, and send the downlink control channel to the UE.

Optionally, the first acquisition module 101 includes:

a fourth acquisition unit, configured to acquire an indication bit for the repetition quantity of the downlink control channel; and a setting unit, configured to set the indication bit according to the repetition quantity of the downlink control channel, so as to indicate the repetition quantity.

The indication bit is a newly added bit or an existing bit.

Optionally, the first acquisition module 101 includes:

a fifth acquisition unit, configured to acquire a frequency domain resource corresponding to the repetition quantity, where the frequency domain resource is a candidate location or search space of the control channel.

Optionally, the sending module 102 includes:

an adding unit, configured to: add the downlink control information to the downlink control channel, and add the downlink control channel to the frequency domain resource; and a fourth sending unit, configured to send the downlink control channel to the UE on the frequency domain resource.

Optionally, the sending module 102 includes:

a fifth sending unit, configured to send a configuration signaling message to the UE, so that the UE determines, according to the configuration signaling message, the repetition quantity that is after a preset effective time; and a sixth sending unit, configured to: add the downlink control information to the downlink control channel according to the repetition quantity, and send the downlink control channel to the UE after the preset effective time expires.

The configuration signaling message is a radio resource control RRC message or a media access control element MAC CE message.

Optionally, the first acquisition module 101 includes:

a sixth acquisition unit, configured to acquire, according to the repetition quantity of the downlink control channel, a subframe set corresponding to the repetition quantity.

Optionally, the sending module 102 includes:

a seventh sending unit, configured to: in the subframe set corresponding to the repetition quantity, add the downlink control information to the downlink control channel, and send the downlink control channel to the UE.

Subframe sets corresponding to multiple repetition quantities include at least one non-overlapping subframe.

Further, the apparatus further includes:

a configuration module, configured to: configure a correspondence between the repetition quantity of the downlink control channel and a repetition quantity of a data channel; and send, to the UE, the correspondence between the repetition quantity of the downlink control channel and the repetition quantity of the data channel; or a presetting module, configured to preset a correspondence between the repetition quantity of the downlink control channel and a repetition quantity of a data channel.

Further, the apparatus further includes:

a third acquisition module, configured to acquire the repetition quantity of the corresponding data channel according to the repetition quantity of the downlink control channel from the correspondence between the repetition quantity of the downlink control channel and the repetition quantity of the data channel; and a first sending or receiving module, configured to: according to the repetition quantity of the data channel, send a downlink data channel or receive an uplink data channel.

In this embodiment of the present invention, processing information corresponding to a repetition quantity of a downlink control channel is acquired, and the downlink control channel is sent to UE according to the processing information. According to the received downlink control channel, the UE determines the repetition quantity of the downlink control channel, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 2

Figure 2:
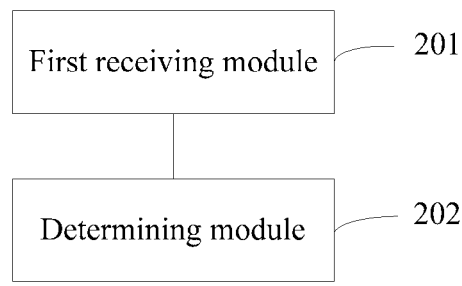
FIG. 2 is a schematic structural diagram of an apparatus for determining a repetition quantity of a downlink control channel according to Embodiment 2 of the present invention.

FIG. 2 is a schematic structural diagram of an apparatus for determining a repetition quantity of a downlink control channel according to an embodiment of the present invention. Referring to FIG. 2, the apparatus includes:

a first receiving module 201, configured to receive a downlink control channel, where the downlink control channel is used to carry processed downlink control information, and the downlink control information is sent by a network side according to processing information corresponding to a repetition quantity of the downlink control channel; and a determining module 202, configured to determine a repetition quantity of the downlink control channel according to the downlink control channel.

Optionally, the determining module 202 includes:

a descrambling unit, configured to: for any repetition quantity in multiple stored repetition quantities, perform, according to a scrambling sequence corresponding to the repetition quantity, descrambling on the processed downlink control information carried on the downlink control channel;

a verification unit, configured to perform verification on descrambled downlink control information according to a cyclic redundancy check CRC bit corresponding to downlink control information carried on the downlink control channel; and a first determining unit, configured to: if the verification succeeds, determine the repetition quantity as the repetition quantity of the downlink control channel.

Further, the descrambling unit includes:

an acquiring subunit, configured to acquire a scrambled CRC bit from the processed downlink control information carried on the downlink control channel; and a first descrambling subunit, configured to perform, according to a mask corresponding to the repetition quantity and a radio network temporary identifier RNTI of user equipment UE, descrambling on the scrambled CRC bit in the processed downlink control information carried on the downlink control channel.

Optionally, when antenna selection is configured, the descrambling unit includes:

a second descrambling subunit, configured to perform, according to the mask corresponding to the repetition quantity, an antenna selection mask, and the RNTI, descrambling on the scrambled CRC bit in the processed downlink control information carried on the downlink control channel.

The descrambling unit includes:

an initialization subunit, configured to initialize a sequence generator according to a scrambling initialization parameter corresponding to the repetition quantity, a number of a timeslot in which the downlink control channel is currently located, and an identity ID value acquired by the UE, so that the sequence generator generates a scrambling sequence; and a third descrambling subunit, configured to perform, according to the scrambling sequence generated by the sequence generator, descrambling on the processed downlink control information carried on the downlink control channel.

Optionally, the descrambling unit includes:

a multiplying subunit, configured to multiply, bit by bit, a symbol corresponding to the processed downlink control information carried on the downlink control channel and the scrambling sequence corresponding to the repetition quantity, to obtain the descrambled downlink control information.

Optionally, the determining module 202 includes:

a seventh acquisition unit, configured to acquire an indication bit in the downlink control information carried on the downlink channel; and a second determining unit, configured to determine the repetition quantity of the downlink control channel according to the indication bit.

The indication bit is a newly added bit or an existing bit.

Optionally, the determining module 202 includes:

a first detection unit, configured to: for any repetition quantity in multiple stored repetition quantities, perform detection on the downlink control channel according to a frequency domain resource corresponding to the repetition quantity, where the frequency domain resource is a candidate location or search space of the downlink control channel; and a third determining unit, configured to: if the detection succeeds, determine the repetition quantity as the repetition quantity of the downlink control channel.

When different repetition quantities are located in different search spaces, an offset exists between adjacent search spaces.

Optionally, the determining module 202 includes:

a receiving unit, configured to receive a configuration signaling message; and a fourth determining unit, configured to determine that a repetition quantity carried in the configuration signaling message is the repetition quantity that is of the downlink control channel and is after a preset effective time.

The configuration signaling message is a radio resource control RRC message or a media access control element MAC CE message.

Optionally, the determining module 202 includes:

an eighth acquisition unit, configured to: for any repetition quantity in multiple stored repetition quantities, acquire the corresponding downlink control channel according to a subframe set corresponding to the repetition quantity;

a second detection unit, configured to perform detection on the acquired downlink control channel; and a fifth determining unit, configured to: if the detection succeeds, determine the repetition quantity as the repetition quantity of the downlink control channel.

Subframe sets corresponding to the multiple repetition quantities include at least one non-overlapping subframe.

Further, the apparatus further includes:

a fourth acquisition module, configured to acquire a repetition quantity of a data channel according to the repetition quantity of the downlink control channel from a stored correspondence between the repetition quantity of the downlink control channel and the repetition quantity of the data channel; and a second sending or receiving module, configured to: according to the repetition quantity of the data channel, send an uplink data channel or receive a downlink data channel.

Further, the apparatus further includes:

the second receiving module, configured to receive the correspondence between the repetition quantity of the downlink control channel and the repetition quantity of the data channel.

In this embodiment of the present invention, processing information corresponding to a repetition quantity of a downlink control channel is acquired, and the downlink control channel is sent to UE according to the processing information. According to the received downlink control channel, the UE determines the repetition quantity of the downlink control channel, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 3

Figure 3:
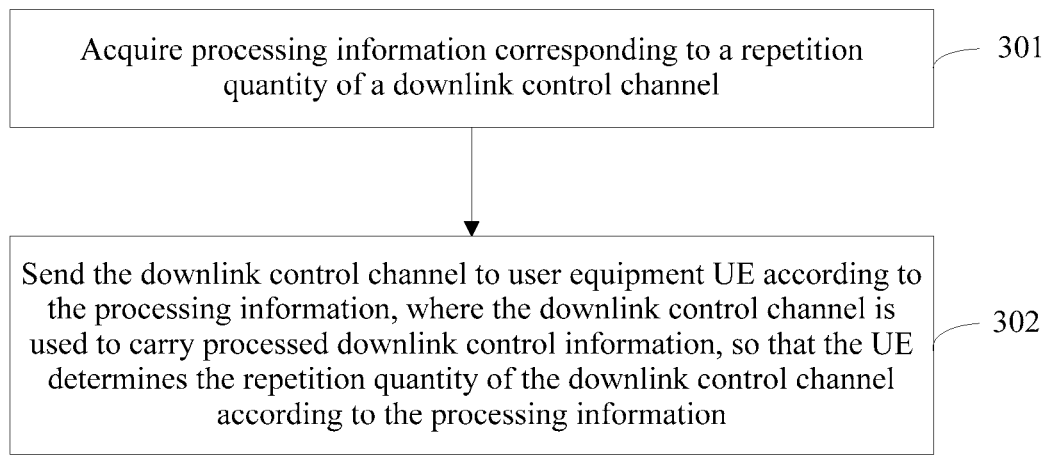
FIG. 3 is a flowchart of a method for determining a repetition quantity of a downlink control channel according to Embodiment 3 of the present invention.

FIG. 3 is a flowchart of a method for determining a repetition quantity of a downlink control channel according to an embodiment of the present invention. Referring to FIG. 3, the method includes:

Step 301. Acquire processing information corresponding to a repetition quantity of a downlink control channel.

Step 302. Send the downlink control channel to user equipment UE according to the processing information, where the downlink control channel is used to carry processed downlink control information, so that the UE determines the repetition quantity of the downlink control channel according to the processing information.

Optionally, the acquiring processing information corresponding to a repetition quantity of a downlink control channel includes:

acquiring a corresponding mask according to the repetition quantity of the downlink control channel.

Optionally, the sending the downlink control channel to user equipment UE according to the processing information includes:

connecting, in series behind downlink control information carried on the downlink control channel, a cyclic redundancy check code CRC bit corresponding to the downlink control information to obtain a bit sequence;

performing, according to the mask and a radio network temporary identifier RNTI of the UE, scrambling on the CRC bit corresponding to the downlink control information carried on the downlink control channel, to obtain the processed downlink control information; and adding the processed downlink control information to the downlink control channel, and sending the downlink control channel to the UE.

The method further includes:

acquiring an antenna selection mask when antenna selection is configured.

Correspondingly, the performing, according to the mask and a radio network temporary identifier RNTI of the UE, scrambling on the CRC bit corresponding to the downlink control information carried on the downlink control channel, to obtain the processed downlink control information includes:

performing, according to the mask, the antenna selection mask, and the RNTI, scrambling on the CRC bit corresponding to the downlink control information carried on the downlink control channel, to obtain the processed downlink control information.

Optionally, the acquiring processing information corresponding to a repetition quantity of a downlink control channel includes:

acquiring a scrambling initialization parameter corresponding to the repetition quantity of the downlink control channel;

acquiring a number of a timeslot in which the downlink control channel is currently located and an identity ID value acquired by a network side; and initializing a sequence generator according to the scrambling initialization parameter, the number of the timeslot in which the downlink control channel is currently located, and the ID value acquired by the network side, so that the sequence generator generates a scrambling sequence.

Optionally, before the sending the downlink control channel to user equipment UE according to the processing information, the method further includes:

connecting a CRC bit in series behind downlink control information to obtain a bit sequence;

performing channel coding on the bit sequence to obtain a coded block; and performing rate matching processing on the coded block to obtain a rate matching bit.

Optionally, the sending the downlink control channel to user equipment UE according to the processing information includes:

performing scrambling on the rate matching bit according to the scrambling sequence generated by the sequence generator, to obtain the processed downlink control information; and adding the processed downlink control information to the downlink control channel, and sending the downlink control channel to the UE.

Further, the method further includes:

performing scrambling and modulation on the rate matching bit to obtain a modulation symbol.

Correspondingly, the sending the downlink control channel to user equipment UE according to the processing information includes:

multiplying, bit by bit, the modulation symbol and a scrambling sequence corresponding to the repetition quantity, to obtain the processed downlink control information; and adding the processed downlink control information to the downlink control channel, and sending the downlink control channel to the UE.

The acquiring processing information corresponding to a repetition quantity of a downlink control channel includes:

acquiring an indication bit for the repetition quantity of the downlink control channel; and setting the indication bit according to the repetition quantity of the downlink control channel, so as to indicate the repetition quantity.

The indication bit is a newly added bit or an existing bit.

Optionally, the acquiring processing information corresponding to a repetition quantity of a downlink control channel includes:

acquiring a frequency domain resource corresponding to the repetition quantity, where the frequency domain resource is a candidate location or search space of the control channel.

Optionally, the sending the downlink control channel to user equipment UE according to the processing information includes:

adding the downlink control information to the downlink control channel, and adding the downlink control channel to the frequency domain resource; and sending the downlink control channel to the UE on the frequency domain resource.

Optionally, the sending the downlink control channel to user equipment UE according to the processing information includes:

sending a configuration signaling message to the UE, so that the UE determines, according to the configuration signaling message, the repetition quantity that is after a preset effective time; and adding the downlink control information to the downlink control channel according to the repetition quantity, and sending the downlink control channel to the UE after the preset effective time expires.

The configuration signaling message is a radio resource control RRC message or a media access control element MAC CE message.

Optionally, the acquiring processing information corresponding to a repetition quantity of a downlink control channel includes:

acquiring, according to the repetition quantity of the downlink control channel, a subframe set corresponding to the repetition quantity.

Optionally, the sending the downlink control channel to user equipment UE according to the processing information includes:

in the subframe set corresponding to the repetition quantity, adding the downlink control information to the downlink control channel, and sending the downlink control channel to the UE.

Subframe sets corresponding to multiple repetition quantities include at least one non-overlapping subframe.

Further, the method further includes:

configuring a correspondence between the repetition quantity of the downlink control channel and a repetition quantity of a data channel, and sending, to the UE, the correspondence between the repetition quantity of the downlink control channel and the repetition quantity of the data channel; or presetting a correspondence between the repetition quantity of the downlink control channel and a repetition quantity of a data channel.

Further, the method further includes:

acquiring the repetition quantity of the corresponding data channel according to the repetition quantity of the downlink control channel from the correspondence between the repetition quantity of the downlink control channel and the repetition quantity of the data channel; and according to the repetition quantity of the data channel, sending a downlink data channel or receiving an uplink data channel.

In this embodiment of the present invention, processing information corresponding to a repetition quantity of a downlink control channel is acquired, and the downlink control channel is sent to UE according to the processing information. According to the received downlink control channel, the UE determines the repetition quantity of the downlink control channel, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 4

Figure 4:
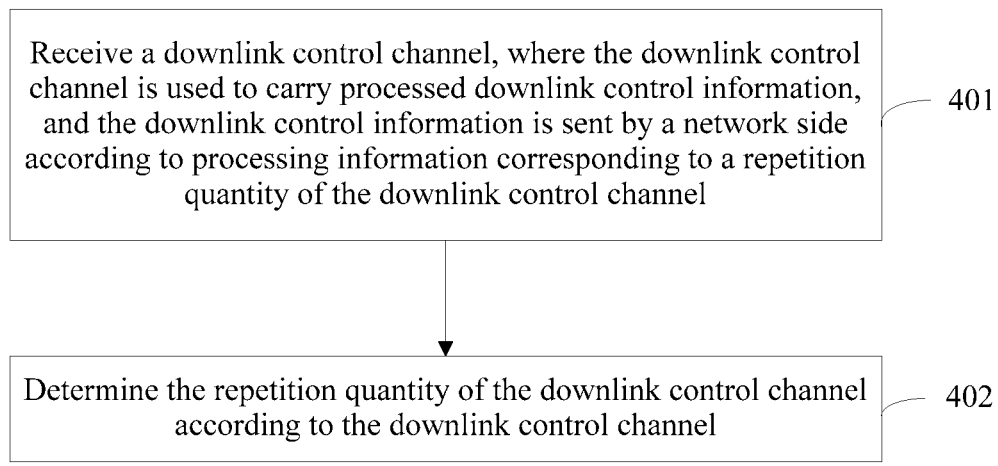
FIG. 4 is a flowchart of a method for determining a repetition quantity of a downlink control channel according to Embodiment 4 of the present invention.

FIG. 4 is a flowchart of a method for determining a repetition quantity of a downlink control channel according to an embodiment of the present invention. Referring to FIG. 4, the method includes:

Step 401. Receive a downlink control channel, where the downlink control channel is used to carry processed downlink control information, and the downlink control information is sent by a network side according to processing information corresponding to a repetition quantity of the downlink control channel.

Step 402. Determine the repetition quantity of the downlink control channel according to the downlink control channel.

Optionally, the determining the repetition quantity of the downlink control channel according to the downlink control channel includes:

for any repetition quantity in multiple stored repetition quantities, performing, according to a scrambling sequence corresponding to the repetition quantity, descrambling on the processed downlink control information carried on the downlink control channel;

performing verification on descrambled downlink control information according to a cyclic redundancy check CRC bit corresponding to downlink control information carried on the downlink control channel; and if the verification succeeds, determining the repetition quantity as the repetition quantity of the downlink control channel.

Optionally, the performing, according to a scrambling sequence corresponding to the repetition quantity, descrambling on the processed downlink control information carried on the downlink control channel includes:

performing, according to a mask corresponding to the repetition quantity and a radio network temporary identifier RNTI of user equipment UE, descrambling on a scrambled CRC bit in the processed downlink control information carried on the downlink control channel.

When antenna selection is configured, the performing, according to a mask corresponding to the repetition quantity and a radio network temporary identifier RNTI of user equipment UE, descrambling on a scrambled CRC bit in the processed downlink control information carried on the downlink control channel includes:

performing, according to the mask corresponding to the repetition quantity, an antenna selection mask, and the RNTI, descrambling on the scrambled CRC bit in the processed downlink control information carried on the downlink control channel.

Optionally, the performing, according to a scrambling sequence corresponding to the repetition quantity, descrambling on the processed downlink control information carried on the downlink control channel includes:

initializing a sequence generator according to a scrambling initialization parameter corresponding to the repetition quantity, a number of a timeslot in which the downlink control channel is currently located, and an identity ID value acquired by the UE, so that the sequence generator generates a scrambling sequence; and performing, according to the scrambling sequence generated by the sequence generator, descrambling on the processed downlink control information carried on the downlink control channel.

Optionally, the performing, according to a scrambling sequence corresponding to the repetition quantity, descrambling on the processed downlink control information carried on the downlink control channel includes:

multiplying, bit by bit, a symbol corresponding to the processed downlink control information carried on the downlink control channel and the scrambling sequence corresponding to the repetition quantity, to obtain the descrambled downlink control information.

Optionally, the determining the repetition quantity of the downlink control channel according to the downlink control channel includes:

acquiring an indication bit in the downlink control information carried on the downlink channel; and determining the repetition quantity of the downlink control channel according to the indication bit.

The indication bit is a newly added bit or an existing bit.

Optionally, the determining the repetition quantity of the downlink control channel according to the downlink control channel includes:

for any repetition quantity in multiple stored repetition quantities, performing detection on the downlink control channel according to a frequency domain resource corresponding to the repetition quantity, where the frequency domain resource is a candidate location or search space of the downlink control channel; and if the detection succeeds, determining the repetition quantity as the repetition quantity of the downlink control channel.

When different repetition quantities are located in different search spaces, an offset exists between adjacent search spaces.

Optionally, the determining the repetition quantity of the downlink control channel according to the downlink control channel includes:

receiving a configuration signaling message; and determining that a repetition quantity carried in the configuration signaling message is the repetition quantity that is of the downlink control channel and is after a preset effective time.

The configuration signaling message is a radio resource control RRC message or a media access control element MAC CE message.

Optionally, the determining the repetition quantity of the downlink control channel according to the downlink control channel includes:

for any repetition quantity in multiple stored repetition quantities, acquiring the corresponding downlink control channel according to a subframe set corresponding to the repetition quantity;

performing detection on the acquired downlink control channel; and if the detection succeeds, determining the repetition quantity as the repetition quantity of the downlink control channel.

Subframe sets corresponding to the multiple repetition quantities include at least one non-overlapping subframe.

Further, the method further includes:

acquiring a repetition quantity of a data channel according to the repetition quantity of the downlink control channel from a stored correspondence between the repetition quantity of the downlink control channel and the repetition quantity of the data channel; and according to the repetition quantity of the data channel, receiving a downlink data channel or sending an uplink data channel.

Further, before the acquiring a repetition quantity of a data channel according to the repetition quantity of the downlink control channel from a stored correspondence between the repetition quantity of the downlink control channel and the repetition quantity of the data channel, the method further includes:

receiving the correspondence between the repetition quantity of the downlink control channel and the repetition quantity of the data channel.

In this embodiment of the present invention, processing information corresponding to a repetition quantity of a downlink control channel is acquired, and the downlink control channel is sent to UE according to the processing information. According to the received downlink control channel, the UE determines the repetition quantity of the downlink control channel, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 5

Figure 5:
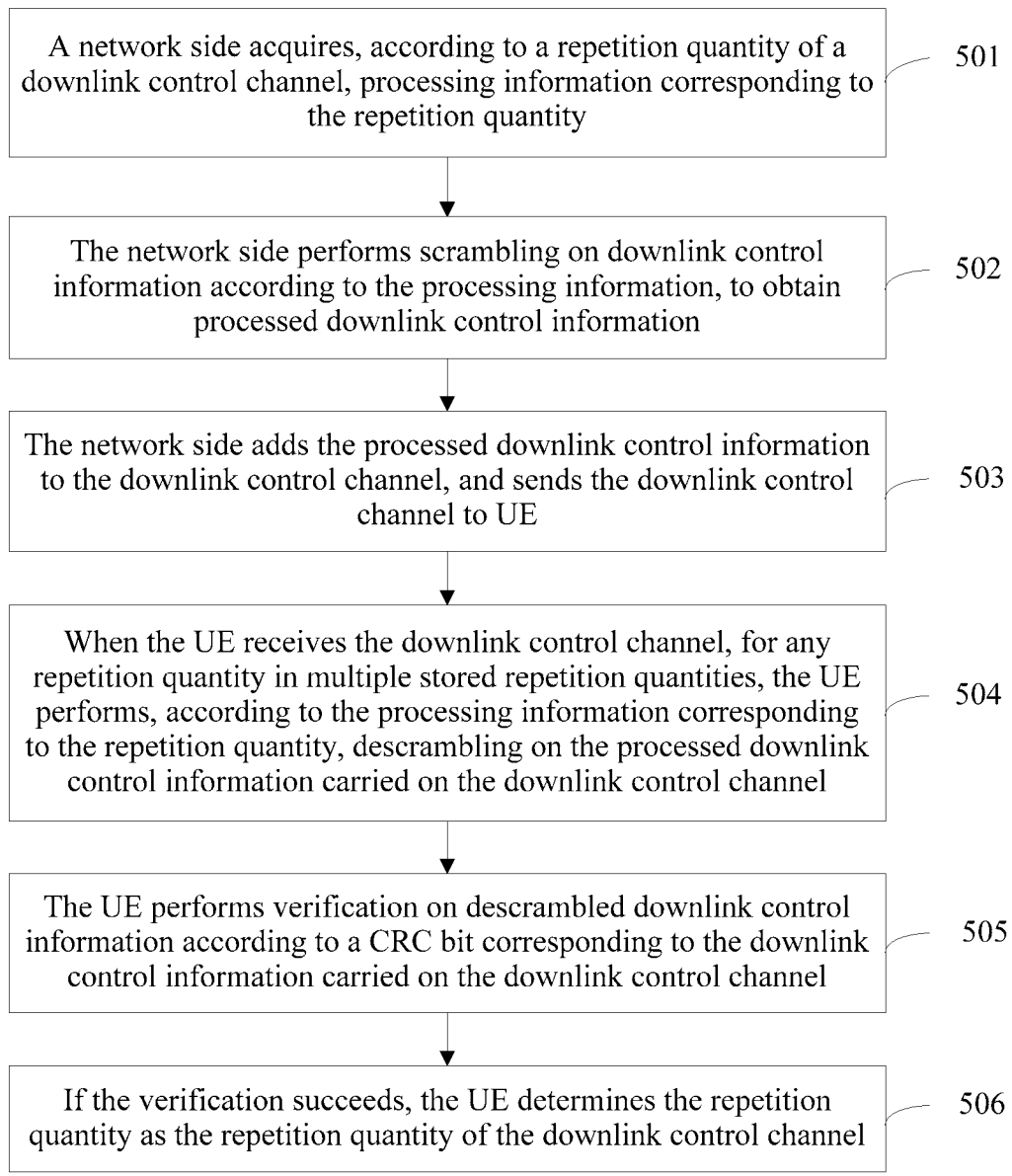
FIG. 5 is a flowchart of a method for determining a repetition quantity of a downlink control channel according to Embodiment 5 of the present invention.

FIG. 5 is a flowchart of a method for determining a repetition quantity of a downlink control channel according to an embodiment of the present invention. Referring to FIG. 5, the method includes the following steps:

Step 501. A network side acquires, according to the repetition quantity of the downlink control channel, processing information corresponding to the repetition quantity.

In this embodiment of the present invention, the processing information is a scrambling sequence, and different repetition quantities are corresponding to different scrambling sequences. Specifically, a method for acquiring, by the network side according to the repetition quantity of the downlink control channel, the processing information corresponding to the repetition quantity may be implemented according to either of the following two methods, which include:

Method 1: The network side configures a corresponding mask for the repetition quantity according to the repetition quantity of the downlink control channel, and determines the mask as the processing information corresponding to the repetition quantity.

Method 2: The network side acquires a corresponding mask according to the repetition quantity of the downlink control channel from a preset correspondence between the repetition quantity and the mask, and determines the mask as the processing information corresponding to the repetition quantity.

When the network side configures a scrambling sequence corresponding to the repetition quantity, before the network side sends the downlink control channel to UE, the network side needs to send, to the UE, the scrambling sequence configured for the repetition quantity. The UE receives and stores the scrambling sequence.

It should be noted that, in this embodiment of the present invention, the mask corresponding to the repetition quantity may be selected from bit strings shown in the following:

<0, 0, 0, 0, 0, 0, 0, 0, 0, 0, 0, 0, 0, 0, 0, 0>,
<0, 0, 0, 0, 0, 0, 0, 0, 0, 0, 0, 0, 0, 0, 0, 1>,
<0, 0, 0, 0, 0, 0, 0, 0, 0, 0, 0, 0, 0, 0, 1, 0>,
<0, 0, 0, 0, 0, 0, 0, 0, 0, 0, 0, 0, 0, 0, 1, 1>
<0, 0, 0, 0, 0, 0, 0, 0, 0, 0, 0, 0, 0, 1, 0, 0>,
<0, 0, 0, 0, 0, 0, 0, 0, 0, 0, 0, 1, 0, 0, 0, 0>,
<1, 1, 1, 1, 1, 1, 1, 1, 1, 1, 1, 1, 1, 1, 1, 1>,
<0, 1, 0, 1, 0, 1, 0, 1, 0, 1, 0, 1, 0, 1, 0, 1>
<1, 0, 1, 0, 1, 0, 1, 0, 1, 0, 1, 0, 1, 0, 1, 0>

In the foregoing bit strings, bit strings

<0, 0, 0, 0, 0, 0, 0, 0, 0, 0, 0, 0, 0, 0, 0, 0>,
<0, 0, 0, 0, 0, 0, 0, 0, 0, 0, 0, 0, 0, 0, 0, 1> are sequences scrambled on CRC (cyclic redundancy check) of a downlink control information format 0, so as to instruct the UE to perform antenna selection; that is, <0,0,0,0,0,0,0,0,0,0,0,0,0,0,0,0> is corresponding to an antenna port 0 of the UE, and <0,0,0,0,0,0,0,0,0,0,0,0,0,0,0,1> is corresponding to an antenna port 1 of the UE. Bit strings <0, 0, 0, 0, 0, 0, 0, 0, 0, 0, 0, 0, 0, 0, 0, 0>,
<1, 1, 1, 1, 1, 1, 1, 1, 1, 1, 1, 1, 1, 1, 1, 1>,
<0, 1, 0, 1, 0, 1, 0, 1, 0, 1, 0, 1, 0, 1, 0, 1> are sequences scrambled on CRC of a BCH (broadcast channel) transport block, so as to instruct the network side to send antenna configuration information. When the scrambling sequence is the mask, an RNTI (radio network temporary identifier), and an antenna selection mask, to make an antenna selection indication and a downlink control channel repetition indication independent of each other, a last bit of the selected mask of the downlink control channel is 0, so as to avoid impact of the downlink control channel on determining a bit status of the antenna selection indication. That is, the mask corresponding to the repetition quantity may be selected from bit strings shown in the following.

<0, 0, 0, 0, 0, 0, 0, 0, 0, 0, 0, 0, 0, 0, 1, 0>,
<0, 0, 0, 0, 0, 0, 0, 0, 0, 0, 0, 0, 0, 1, 0, 0>,
<0, 0, 0, 0, 0, 0, 0, 0, 0, 0, 0, 0, 0, 1, 1, 0>,
<0, 0, 0, 0, 0, 0, 0, 0, 0, 0, 0, 0, 1, 0, 0, 0>,
<1, 1, 1, 1, 1, 1, 1, 1, 1, 1, 1, 1, 1, 1, 1, 0>,
<0, 1, 0, 1, 0, 1, 0, 1, 0, 1, 0, 1, 0, 1, 0, 0>
<1, 0, 1, 0, 1, 0, 1, 0, 1, 0, 1, 0, 1, 0, 1, 0>

Optionally, in this embodiment of the present invention, the network side may further acquire a corresponding repetition level according to the repetition quantity of the downlink control channel from a stored correspondence between the repetition quantity and the repetition level; acquire, according to the acquired repetition level, processing information corresponding to the repetition level; and determine the acquired processing information as the processing information corresponding to the repetition quantity.

The correspondence between the repetition quantity and the repetition level is preset by the network side. On the UE side, the UE may also preset the correspondence between the repetition quantity and the repetition level. Certainly, the network side may also configure the correspondence between the repetition quantity and the repetition level, and send the correspondence between the repetition quantity and the repetition level to the UE.

In this embodiment of the present invention, the downlink control channel may be a PDCCH (physical downlink control channel), or may be an EPDCCH (enhanced physical downlink control channel).

Each repetition level is corresponding to a repetition quantity. For example, the downlink control channel includes three repetition levels: a repetition level 1, a repetition level 2, and a repetition level 3. A repetition quantity corresponding to the repetition level 1 may be 5, a repetition quantity corresponding to the repetition level 2 may be 10, and a repetition quantity corresponding to the repetition level 3 may be 20.

Step 502. The network side performs scrambling on downlink control information according to the processing information, to obtain processed downlink control information.

When the processing information is the mask, a specific operation of performing, by the network side, scrambling on the downlink control information according to the processing information may be as follows: The network side acquires a CRC bit corresponding to the downlink control information, and connects the a CRC bit in series behind the downlink control information to obtain a bit sequence. The network side acquires an RNTI of the UE, and performs scrambling on the CRC bit in the bit sequence according to the mask and the RNTI of the UE, to obtain the processed downlink control information.

A specific operation of performing, by the network side, scrambling on the CRC bit in the bit sequence according to the mask and the RNTI of the UE may be as follows: The network side may perform scrambling on the CRC bit in the bit sequence according to the mask and the RNTI of the UE by using the following formula (1), to obtain a scrambled CRC bit.

$$c_k = (p_k + x_{rnti,k} + x_{REP,k}) \bmod 2 \quad (1)$$

In the foregoing formula (1), $c_k$ is the scrambled CRC bit, $p_k$ is the CRC bit, $x_{rnti,k}$ is the RNTI, $x_{REP,k}$ is the mask, k is a number of a bit, and mod is a modulo operation. For the CRC bit corresponding to the downlink control information, k=0, 1, . . . , 16.

When the processing information is the mask and antenna selection is configured, a specific operation of performing, by the network side, scrambling on the downlink control information according to the processing information, to obtain the processed downlink control information may be as follows: The network side acquires the CRC bit corresponding to the downlink control information, the RNTI of the UE, and an antenna selection mask; connects the a CRC bit in series behind the downlink control information to obtain the bit sequence; and performs scrambling on the CRC bit in the bit sequence according to the mask, the antenna selection mask, and the RNTI of the UE, to obtain the processed downlink control information.

A specific operation of performing, by the network side, scrambling on the CRC bit in the bit sequence according to the mask, the antenna selection mask, and the RNTI of the UE may be as follows: The network side performs scrambling on the CRC bit in the bit sequence according to the mask, the antenna selection mask, and the RNTI of the UE by using the following formula (2), to obtain the scrambled CRC bit.

$$c_k = (p_k + x_{rnti,k} + x_{REP,k} + x_{AS,k}) \bmod 2 \quad (2)$$

In the foregoing formula (2), $x_{AS,k}$ is the antenna selection mask.

A method for acquiring a CRC bit may be specifically: connecting k 0s in series behind the downlink control information; dividing, by a bit corresponding to a generator polynomial, the downlink control information with k 0s connected behind in series, to obtain a corresponding remainder; and determining the remainder as the CRC bit, where the division is binary division. In this embodiment of the present invention, k may be 16.

A 16-bit generator polynomial may be obtained according to the following formula (3):

$$g_{CRC16}(D) = [D^{16} + D^{12} + D^5 + 1] \quad (3)$$

In the foregoing formula (3), $g_{CRC16}(D)$ is the generator polynomial, and D indicates that a binary digit to the corresponding power in the polynomial is 1.

Bits corresponding to the generator polynomial are 10001000000100001.

Step 503. The network side adds the processed downlink control information to the downlink control channel, and sends the downlink control channel to UE.

It should be noted that, when the network side adds the processed downlink control information to the downlink control channel, the processed downlink control information is obtained after the network side performs a series of processing on the downlink control information. The series of processing may be a part or all of processing including CRC addition, CRC scrambling, coding, rate matching, scrambling, modulation, layer mapping, precoding, resource mapping, and OFDM (orthogonal frequency division multiplexing) symbol generation. It should be understood that the processed downlink control information can be carried on the downlink control channel and sent. For a receive end, it is a reverse process of the foregoing description, and details are not described. When the downlink control channel is a PDCCH, the series of processing further includes a multiplexing processing.

In this embodiment of the present invention, each time the network side repeatedly sends the downlink control channel, the network side performs, according to the foregoing step, scrambling on the downlink control information corresponding to the downlink control channel, to obtain the processed downlink control information; adds the processed downlink control information to the downlink control channel; and sends the downlink control channel to the UE.

Step 504. When the UE receives the downlink control channel, for any repetition quantity in multiple stored repetition quantities, the UE performs, according to the processing information corresponding to the repetition quantity, descrambling on the processed downlink control information carried on the downlink control channel.

When the processing information is the mask, a specific operation of performing, by the UE according to the processing information corresponding to the repetition quantity, descrambling on the processed downlink control information carried on the downlink control channel may be as follows: The UE acquires the RNTI of the UE and the mask corresponding to the repetition quantity; and performs, by using the following formula (4) and according to the mask corresponding to the repetition quantity and the RNTI of the UE, descrambling on a scrambled CRC bit in the processed downlink control information, to obtain a CRC bit.

$$p_k = (c_k + x_{rnti,k} + x_{REP,k}) \bmod 2 \quad (4)$$

When the processing information is the mask and antenna selection is configured, a specific operation of performing, by the UE according to the processing information corresponding to the repetition quantity, descrambling on the processed downlink control information carried on the downlink control channel may be as follows: The UE acquires the mask corresponding to the repetition quantity, the RNTI of the UE, and the antenna selection mask; performs, by using the following formula (5) and according to the mask corresponding to the repetition quantity, the antenna mask, and the RNTI of the UE, descrambling on the scrambled CRC bit in the processed downlink control information, to obtain the CRC bit.

$$p_k = (c_k + x_{rnti,k} + x_{REP,k} + x_{AS,k}) \bmod 2 \quad (5)$$

Step 505. The UE performs verification on descrambled downlink control information according to a CRC bit corresponding to the downlink control information carried on the downlink control channel.

Specifically, the UE obtains, after performing descrambling on the CRC bit, a bit sequence that includes the downlink control information and the CRC bit, and performs binary division on the bit sequence according to a bit corresponding to a generator polynomial to obtain a corresponding remainder, where the generator polynomial is corresponding to the CRC bit that is corresponding to the downlink control information carried on the downlink control channel. If the remainder is 0, it is determined that the verification succeeds; if the remainder is not 0, it is determined that the verification fails.

Step 506. If the verification succeeds, the UE determines the repetition quantity as the repetition quantity of the downlink control channel.

Further, if the verification fails, the foregoing steps 504 to 506 are executed for another repetition quantity in the multiple stored repetition quantities to determine the repetition quantity of the downlink control channel. Further, after the UE determines the repetition quantity of the downlink control channel, the UE may further acquire a repetition quantity of a corresponding data channel according to the repetition quantity of the downlink control channel from a stored correspondence between the repetition quantity of the downlink control channel and the repetition quantity of the data channel. According to the repetition quantity of the data channel, the UE may receive a downlink data channel or send an uplink data channel.

The stored correspondence between the repetition quantity of the downlink control channel and the repetition quantity of the data channel may be a correspondence, sent by the network side, between the repetition quantity of the downlink control channel and the repetition quantity of the data channel. Certainly, the stored correspondence between the repetition quantity of the downlink control channel and the repetition quantity of the data channel may also be preset by the UE.

Optionally, the network side may acquire the repetition quantity of the data channel according to an order of the repetition quantity of the downlink control channel. That is, repetition quantities of the downlink control channel are sorted in advance, and repetition quantities of the data channel are sorted in advance, where orders of the repetition quantities of the downlink control channel and orders of the repetition quantities of the data channel are in one to one correspondence.

In this embodiment of the present invention, scrambling is performed, according to a scrambling sequence corresponding to the repetition quantity, on a CRC bit corresponding to downlink control information carried on the downlink control channel, to obtain processed downlink control information. The processed downlink control information is added to the downlink control channel and is sent to UE. The UE performs descrambling on the processed downlink control information according to the scrambling sequence corresponding to the repetition quantity, performs verification on descrambled downlink control information, and determines the repetition quantity as a repetition quantity of the downlink control channel if the verification succeeds, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 6

Figure 6:
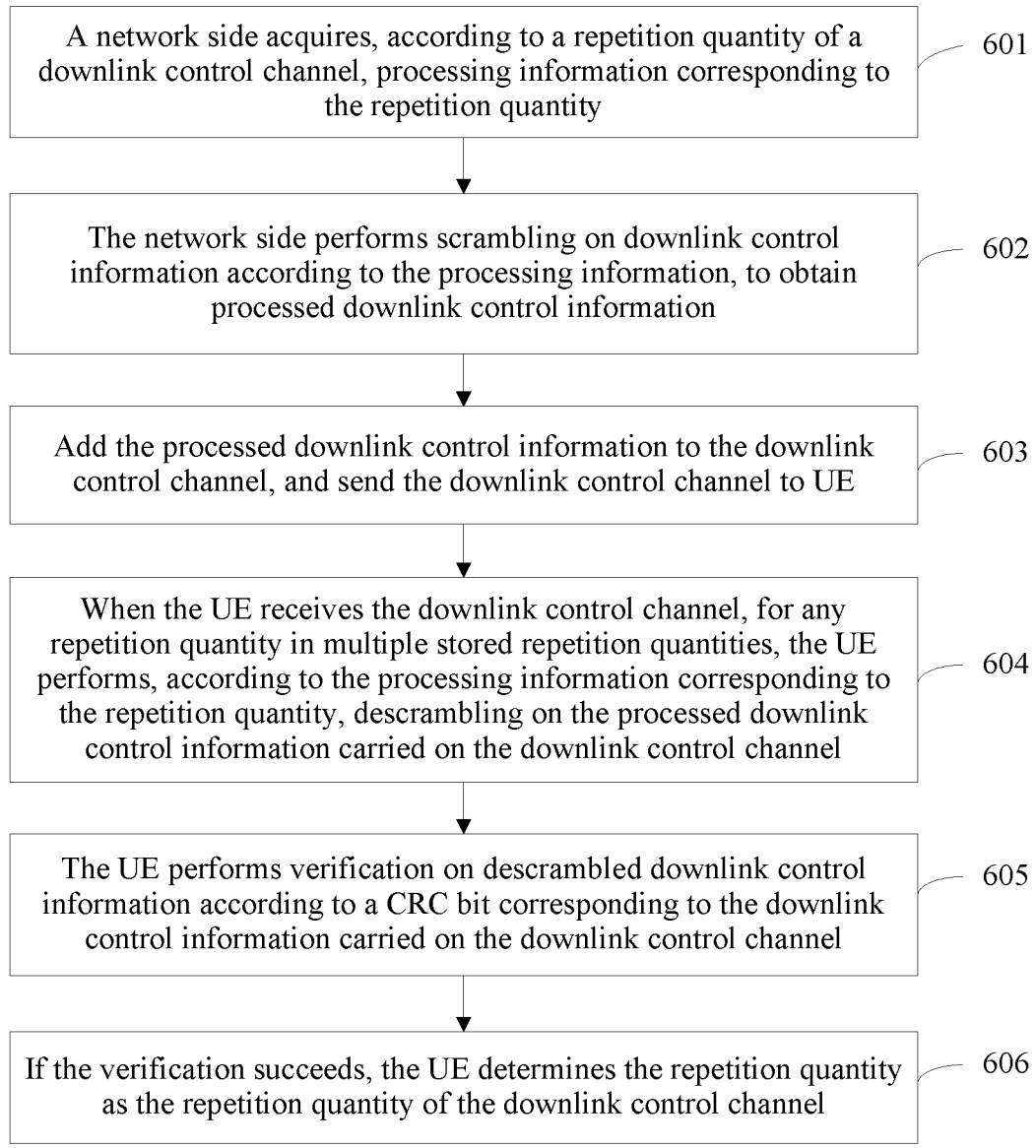
FIG. 6 is a flowchart of a method for determining a repetition quantity of a downlink control channel according to Embodiment 6 of the present invention.

FIG. 6 is a flowchart of a method for determining a repetition quantity of a downlink control channel according to an embodiment of the present invention. Referring to FIG. 6, the method includes the following steps:

Step 601. A network side acquires, according to a repetition quantity of a downlink control channel, processing information corresponding to the repetition quantity.

The network side may acquire the processing information corresponding to the repetition quantity according to any one of the following three methods, which include:

Method 1: The network side configures, according to the repetition quantity of the downlink control channel, a corresponding scrambling initialization parameter for the repetition quantity, acquires a number of a timeslot in which the downlink control channel is currently located and an ID (identity) value acquired by the network side, and initializes a sequence generator according to the scrambling initialization parameter, the number of the timeslot in which the downlink control channel is currently located, and the ID value acquired by the network side, so that the sequence generator generates a scrambling sequence, and the scrambling sequence generated by the sequence generator is determined as the processing information corresponding to the repetition quantity.

Method 2: The network side acquires a corresponding scrambling initialization parameter according to the repetition quantity of the downlink control channel from a preset correspondence between the repetition quantity and the scrambling initialization parameter, acquires a number of a timeslot in which the downlink control channel is currently located and an ID value acquired by the network side, and initializes a sequence generator according to the acquired scrambling initialization parameter, the number of the timeslot in which the downlink control channel is currently located, and the ID value acquired by the network side, so that the sequence generator generates a scrambling sequence, and the scrambling sequence generated by the sequence generator is determined as the processing information corresponding to the repetition quantity.

In this embodiment of the present invention, when the downlink control channel is a PDCCH, the ID value is an ID value of a cell in which the UE is located; when the downlink control channel is an EPDCCH, the ID value is a specific ID value of the UE.

Method 3: The network side configures, according to the repetition quantity of the downlink control channel, a corresponding scrambling initialization parameter for the repetition quantity, and determines the scrambling initialization parameter as the processing information corresponding to the repetition quantity.

Further, after determining the scrambling initialization parameter as the processing information corresponding to the repetition quantity, the network side acquires a number of a timeslot in which the downlink control channel is currently located and an ID value acquired by the network side, and initializes a sequence generator according to the acquired scrambling initialization parameter, the number of the timeslot in which the downlink control channel is currently located, and the ID value acquired by the network side, so that the sequence generator generates a scrambling sequence.

Optionally, in this embodiment of the present invention, the network side may further acquire a corresponding repetition level according to the repetition quantity of the downlink control channel from a stored correspondence between the repetition quantity and the repetition level; acquire, according to the acquired repetition level, processing information corresponding to the repetition level; and determine the acquired processing information as the processing information corresponding to the repetition quantity.

In this embodiment of the present invention, the downlink control channel may be a PDCCH, or may be an EPDCCH.

Each repetition level is corresponding to a repetition quantity. For example, the downlink control channel includes three repetition levels: a repetition level 1, a repetition level 2, and a repetition level 3. A repetition quantity corresponding to the repetition level 1 may be 5, a repetition quantity corresponding to the repetition level 2 may be 10, and a repetition quantity corresponding to the repetition level 3 may be 20.

In this embodiment of the present invention, the scrambling sequence may be a Gold sequence, where the Gold sequence may be generated by using a Gold sequence generator. The network side may initialize the sequence generator according to the scrambling initialization parameter, the number of the timeslot in which the downlink control channel is currently located, and the ID value acquired by the network side, so that the sequence generator generates the scrambling sequence, where the scrambling initialization parameter includes a parameter corresponding to the repetition quantity.

When the downlink control channel is a PDCCH, the network side may generate a scrambling initialization value according to the following scrambling initialization parameters: the repetition level corresponding to the repetition quantity, the number of the timeslot in which the downlink control channel is currently located, and the ID value of the cell in which the UE is located. A scrambling initialization value of the Gold sequence generator is calculated according to the following formula (1):

$$c_{init} = r \cdot 2^{13} + \lfloor n_s/2 \rfloor 2^9 + N_{ID}^{cell} \quad (1)$$

In the foregoing formula (1), $c_{init}$ is the scrambling initialization value of the sequence generator, r is the repetition level corresponding to the repetition quantity, $n_s$ is the number of the timeslot in which the downlink control channel is currently located, and $N_{ID}^{cell}$ is the ID value of the cell in which the UE is located.

When the downlink control channel is an EPDCCH channel, a scrambling initialization value may be generated according to the following scrambling initialization parameters: the repetition level corresponding to the repetition quantity, the number of the timeslot in which the downlink control channel is currently located, and the ID value of the cell in which the UE is located. A scrambling initialization value of the Gold sequence generator is calculated according to the following formula (2):

$$c_{init} = r \cdot 2^{13} + \lfloor n_s/2 \rfloor \cdot 2^9 + n_{ID,m}^{EPDCCH} \quad (2)$$

In the foregoing formula (2), $c_{init}$ is the scrambling initialization value of the sequence generator, r is the repetition level corresponding to the repetition quantity, $n_s$ is the number of the timeslot in which the downlink control channel is currently located, and $n_{ID,m}^{EPDCCH}$ is an ID value of the scrambling initialization parameter configured by the network side.

A value range of the number of the timeslot may be 0 to 19, and a value range of the ID value in this embodiment of the present invention may be 0 to 503.

Further, the network side may send the repetition quantity or the corresponding scrambling initialization parameter to the UE, so that the UE generates the scrambling sequence according to the scrambling initialization parameter, or the network side may send the generated scrambling sequence to the UE after initializing the sequence generator according to the scrambling initialization parameter.

Step 602. The network side performs scrambling on downlink control information according to the processing information, to obtain processed downlink control information.

Specifically, the network side acquires a CRC bit corresponding to the downlink control information, connects the acquired the CRC bit in series behind the downlink control information to obtain a bit sequence, performs channel coding on the bit sequence to obtain a coded block, performs rate matching processing on the coded block to obtain a rate matching bit, and performs scrambling on the rate matching bit according to the scrambling sequence generated by the sequence generator, to obtain the processed downlink control information.

When the downlink control channel is a PDCCH, the performing scrambling on the rate matching bit to obtain the processed downlink control information includes: performing multiplexing on the rate matching bit to obtain a multiplexed bit, and performing scrambling on the multiplexed bit to obtain the processed downlink control information.

A method for acquiring a CRC bit may be specifically: connecting k 0s in series behind the downlink control information; dividing, by a bit corresponding to a generator polynomial, the downlink control information with k 0s connected behind in series, to obtain a corresponding remainder; and determining the remainder as the CRC bit, where the division may be binary division, or may be modulo-2 division. In this embodiment of the present invention, k may be 16.

A 16-bit generator polynomial may be obtained according to the following formula (3):

$$g_{CRC16}(D)=[D^{16}+D^{12}+D^{5}+1] \quad (3)$$

In the foregoing formula (3), $g_{CRC16}(D)$ is the generator polynomial, and D indicates that a binary digit to the corresponding power in the polynomial is 1.

Bits corresponding to the generator polynomial are 10001000000100001.

A specific operation of performing scrambling on the rate matching bit according to the scrambling sequence generated by the sequence generator, to obtain the processed downlink control information may be as follows:

The sequence generator generates the scrambling sequence (Gold sequence), that is, the following c(n). The Gold sequence c(n) is synthesized from two m sequences, and the two m sequences generated by two m sequence generators are x1 and x2, as shown in the following formula (4):

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad (4)$$

In the foregoing formula (4), n=0, 1, ..., $M_{PN}$−1, where $M_{PN}$ is a length of the scrambling sequence (Gold sequence), which is corresponding to a length of a to-be-scrambled bit block, for example, a length $M_{bit}$ of a rate matching bit block; Nc=600 and is a constant; an initialization value of a first m sequence is a constant: $x_1(0)=1$, $x_1(n)=0$, n=1, 2, ..., 30; an initialization value of a second m sequence is the scrambling initialization value of the Gold sequence mentioned above, that is $x_2(n)=c_{init}$, n=0, ... 30. For a PDCCH, $c_{init}=r \cdot 2^{13}+\lfloor n_s/2 \rfloor \cdot 2^9+N_{ID}^{cell}$; for an EPDCCH, $c_{init}=r \cdot 2^{13}+\lfloor n_s/2 \rfloor \cdot 2^9+n_{ID,m}^{EPDCCH}$. The initialization sequence generator may be performed in each subframe of a repeatedly transmitted PDCCH or EPDCCH.

For a to-be-scrambled bit string or bit sequence or bit block b(0), ..., b($M_{bit}$−1) whose length is $M_{bit}$ a scrambled bit block or a bit block existing before modulation is obtained by performing modulo-2 addition bit by bit according to the following formula (5):

$$\tilde{b}(i)=(b(i)+c(i)) \bmod 2 \quad (5)$$

In the foregoing formula (5), $\tilde{b}(i)$ is an $i^{th}$ bit in the scrambled bit block or the bit block existing before modulation, and c(i) is an $i^{th}$ bit in the scrambling sequence generated by the sequence generator.

Optionally, the initialization sequence generator may be performed in a start subframe of a repeatedly transmitted PDCCH or EPDCCH. In this case, a scrambling initialization value of a repeated subframe behind the start subframe is the same as a scrambling initialization value of the start subframe, that is, scrambling sequences of the two subframes are the same.

Optionally, in this embodiment of the present invention, the scrambling sequence may be generated without using the sequence generator, and the network side may directly configure the corresponding scrambling sequence for the repetition quantity of the downlink control channel. When the network side directly configures the corresponding scrambling sequence for the repetition quantity of the downlink control channel, a specific operation of performing, by the network side, scrambling on the downlink control information according to the processing information, to obtain the processed downlink control information may be as follows: The network side connects a CRC bit in series behind the downlink control information to obtain a bit sequence, performs channel coding on the bit sequence to obtain a coded block, performs rate matching processing on the coded block to obtain a rate matching bit, performs scrambling and modulation on the rate matching bit, and multiplies modulated downlink control information and the scrambling sequence corresponding to the repetition quantity, to obtain the processed downlink control information.

It is assumed that a symbol sequence of the modulated downlink control information is d(0), ..., d($M_{symb}$−1), and the scrambling sequence corresponding to the repetition quantity is $s^0(0)$, ..., $s^0(M_{symb}−)$, ..., $s^{r-1}(0)$, ..., $s^{r-1}(M_{symb}−1)$. A symbol of the downlink control information and a symbol of the scrambling sequence corresponding to the repetition quantity are multiplied bit by bit to obtain the processed downlink control information.

The scrambling sequence configured by the network side for the repetition quantity may be a periodic extension of a sequence

<1, 1, >,
<+1, −1>,
<−1, +1>.

Optionally, in this embodiment of the present invention, when the network side directly configures the scrambling sequence for the repetition quantity, the network side may perform, by using a value of the scrambling sequence, scrambling on each subframe that is used to repeatedly transmit the downlink control channel. The value is applied to scrambling on each symbol in the subframe, that is, a multiplication operation is performed on each symbol in the subframe. For example, a quantity of subframes in a subframe group corresponding to the repetition quantity is 4, a scrambling sequence of the subframes in the subframe group is {1, 1, 1, 1}, and each value in the scrambling sequence is corresponding to a scrambling value in a subframe. The multiplication operation is performed on the scrambling value and each symbol in the subframe, so as to implement scrambling on the subframe. For example, a quantity of subframes in a subframe group corresponding to the repetition quantity is 8, a scrambling sequence of the subframes in the subframe group is {1, 1, 1, −1, 1, −1, 1, −1}, and each value in the scrambling sequence is corresponding to a scrambling value in a subframe. The multiplication operation is performed on the scrambling value and each symbol in the subframe, so as to implement scrambling on the subframe. For example, a quantity of subframes in a subframe group corresponding to the repetition quantity is 16, a scrambling sequence of the subframes in the subframe group is {−1, 1, −1, 1, −1, 1, −1, 1, −1, 1, −1, 1, −1, 1, −1, 1}, and each value in the scrambling sequence is corresponding to a scrambling value in a subframe. The multiplication operation is performed on the scrambling value and each symbol in the subframe, so as to implement scrambling on the subframe.

Step 603: Add the processed downlink control information to the downlink control channel, and send the downlink control channel to UE.

It should be noted that, when the network side adds the processed downlink control information to the downlink control channel, the processed downlink control information is obtained after the network side performs a series of processing on the downlink control information. The series of processing may be a part or all of processing including CRC addition, CRC scrambling, coding, rate matching, scrambling, modulation, layer mapping, precoding, resource mapping, and OFDM (Orthogonal Frequency Division Multiplex, orthogonal frequency division multiplexing) symbol generation. It should be understood that the processed downlink control information can be carried on the downlink control channel and sent. For a receive end, it is a reverse process of the foregoing description, and details are not described. When the downlink control channel is a PDCCH, the series of processing further includes a multiplexing processing.

In this embodiment of the present invention, each time the network side repeatedly sends the downlink control channel, the network side performs, according to the foregoing step, scrambling on the downlink control information corresponding to the downlink control channel, to obtain the processed downlink control information; adds the processed downlink control information to the downlink control channel; and sends the downlink control channel to the UE.

Step 604. When the UE receives the downlink control channel, for any repetition quantity in multiple stored repetition quantities, the UE performs, according to the processing information corresponding to the repetition quantity, descrambling on the processed downlink control information carried on the downlink control channel.

When the network side sends the scrambling sequence generated by the sequence generator to the UE, the UE may perform, according to the received scrambling sequence, descrambling on the processed downlink control information carried on the downlink control channel. When the network side does not send the scrambling sequence corresponding to the repetition quantity to the UE, a specific operation of performing, by the UE according to the processing information corresponding to the repetition quantity, descrambling on the processed downlink control information carried on the downlink control channel may be as follows: The UE initializes the sequence generator according to the scrambling initialization parameter corresponding to the repetition quantity, so that the sequence generator generates the scrambling sequence, and the UE performs, according to the scrambling sequence, descrambling on the processed downlink control information carried on the downlink control channel.

The method for acquiring, by the UE, the corresponding scrambling initialization parameter according to the repetition quantity may be either of the following two cases, which include:

Case 1: After the repetition quantity and the scrambling initialization parameter that are sent by the network side are received, a correspondence between the repetition quantity and the scrambling initialization parameter is stored, and the corresponding scrambling initialization parameter is acquired according to the repetition quantity from the stored correspondence between the repetition quantity and the scrambling initialization parameter.

Case 2: The scrambling initialization parameter corresponding to the repetition quantity is calculated according to the method in the foregoing step 601.

A specific operation of performing, by the UE according to the scrambling sequence, descrambling on the processed downlink control information carried on the downlink control channel may be as follows:

The sequence generator generates the scrambling sequence (Gold sequence), that is, the following c(n). The Gold sequence c(n) is synthesized from two m sequences, and the two m sequences generated by two m sequence generators are x1 and x2, as shown in the following formula (6):

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad (6)$$

In the foregoing formula (6), n=0, 1, . . . , $M_{PN}$−1, where $M_{PN}$ is a length of the scrambling sequence (Gold sequence), which is corresponding to a length of a to-be-scrambled bit block, for example, a length $M_{bit}$ of a rate matching bit block; Nc=600 and is a constant; an initialization value of a first m sequence is a constant: $x_1(0)$=1, $x_1(n)$=0, n=1, 2, . . . , 30; an initialization value of a second m sequence is the scrambling initialization value of the Gold sequence mentioned above; for a PDCCH, $c_{init}$=r·$2^{13}$+$\lfloor n_s/2 \rfloor 2^9$+ $N_{ID}^{cell}$, and scrambling initialization parameters of the PDCCH include: r corresponding to a repetition quantity or a repetition level, a timeslot number, and a cell ID; for an EPDCCH, $c_{init}$=r·$2^{13}$+$\lfloor n_s/2 \rfloor \cdot 2^9$+$n_{ID,m}^{EPDCCH}$, and scrambling initialization parameters of the EPDCCH include: r corresponding to a repetition quantity or a repetition level, a timeslot number, and a cell ID. The initialization sequence generator may be performed in each subframe of a repeatedly transmitted PDCCH or EPDCCH.

For a scrambled bit string or bit sequence or bit block whose length is $M_{bit}$, a descrambled bit block is obtained by performing modulo-2 addition bit by bit according to the following formula (7):

$$b(i)=(\tilde{b}(i)+c(i))\bmod 2 \quad (7)$$

Optionally, the initialization sequence generator may be performed in a start subframe of a repeatedly transmitted PDCCH or EPDCCH. In this case, a scrambling initialization value of a repeated subframe behind the start subframe is the same as a scrambling initialization value of the start subframe, that is, scrambling sequences of the two subframes are the same.

Further, when the scrambling sequence corresponding to the repetition quantity is not generated by the sequence generator but directly configured by the network side for the repetition quantity, a specific operation of performing, by the network side according to the scrambling sequence, descrambling on the processed downlink control information carried on the downlink control channel may be as follows: The network side multiplies, bit by bit, a symbol corresponding to the processed downlink control information carried on the downlink control channel and the scrambling sequence corresponding to the repetition quantity, to obtain modulated downlink control information.

Step 605. The UE performs verification on descrambled downlink control information according to a CRC bit corresponding to the downlink control information carried on the downlink control channel.

Specifically, when the descrambled downlink control information is a rate matching bit, the UE performs rate de-matching on the rate matching bit to obtain a coded block, performs decoding on the coded block to obtain a bit sequence, and performs binary division on the bit sequence according to a bit corresponding to a generator polynomial to obtain a corresponding remainder, where the generator polynomial is corresponding to the CRC bit that is corresponding to the downlink control information carried on the downlink control channel. If the remainder is 0, it is determined that the verification succeeds; if the remainder is not 0, it is determined that the verification fails.

Further, when the descrambled downlink control information is modulated downlink control information, the UE performs demodulation on the modulated downlink control information to obtain a rate matching bit. The UE performs rate de-matching on the rate matching bit to obtain a coded block, performs decoding on the coded block to obtain a bit sequence, and performs binary division on the bit sequence according to a bit corresponding to a generator polynomial to obtain a corresponding remainder, where the generator polynomial is corresponding to the CRC bit that is corresponding to the downlink control information carried on the downlink control channel. If the remainder is 0, it is determined that the verification succeeds; if the remainder is not 0, it is determined that the verification fails.

Step 606. If the verification succeeds, the UE determines the repetition quantity as the repetition quantity of the downlink control channel.

Further, if the verification fails, for another repetition quantity in the multiple stored repetition quantities, the foregoing steps 604 to 606 are executed to determine the repetition quantity of the downlink control channel.

Further, after the UE determines the repetition quantity of the downlink control channel, the UE may further acquire a repetition quantity of a corresponding data channel according to the repetition quantity of the downlink control channel from a stored correspondence between the repetition quantity of the downlink control channel and the repetition quantity of the data channel. According to the repetition quantity of the data channel, the UE may receive a downlink data channel or send an uplink data channel.

The stored correspondence between the repetition quantity of the downlink control channel and the repetition quantity of the data channel may be a correspondence, sent by the network side, between the repetition quantity of the downlink control channel and the repetition quantity of the data channel. Certainly, the stored correspondence between the repetition quantity of the downlink control channel and the repetition quantity of the data channel may also be preset by the UE.

Optionally, the network side may acquire the repetition quantity of the data channel according to an order of the repetition quantity of the downlink control channel. That is, repetition quantities of the downlink control channel are sorted in advance, and repetition quantities of the data channel are sorted in advance, where orders of the repetition quantities of the downlink control channel and orders of the repetition quantities of the data channel are in one to one correspondence.

In this embodiment of the present invention, a CRC bit is connected in series behind downlink control information to obtain a bit sequence, channel coding is performed on the bit sequence to obtain a coded block, and rate matching processing is performed on the coded block to obtain a rate matching bit. Scrambling is performed on the rate matching bit according to a scrambling sequence corresponding to the repetition quantity, to obtain processed downlink control information. The processed downlink control information is added to the downlink control channel and is sent to UE. The UE performs descrambling on the processed downlink control information according to the scrambling sequence corresponding to the repetition quantity, performs verification on descrambled downlink control information, and determines the repetition quantity as a repetition quantity of the downlink control channel if the verification succeeds, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 7

Figure 7:
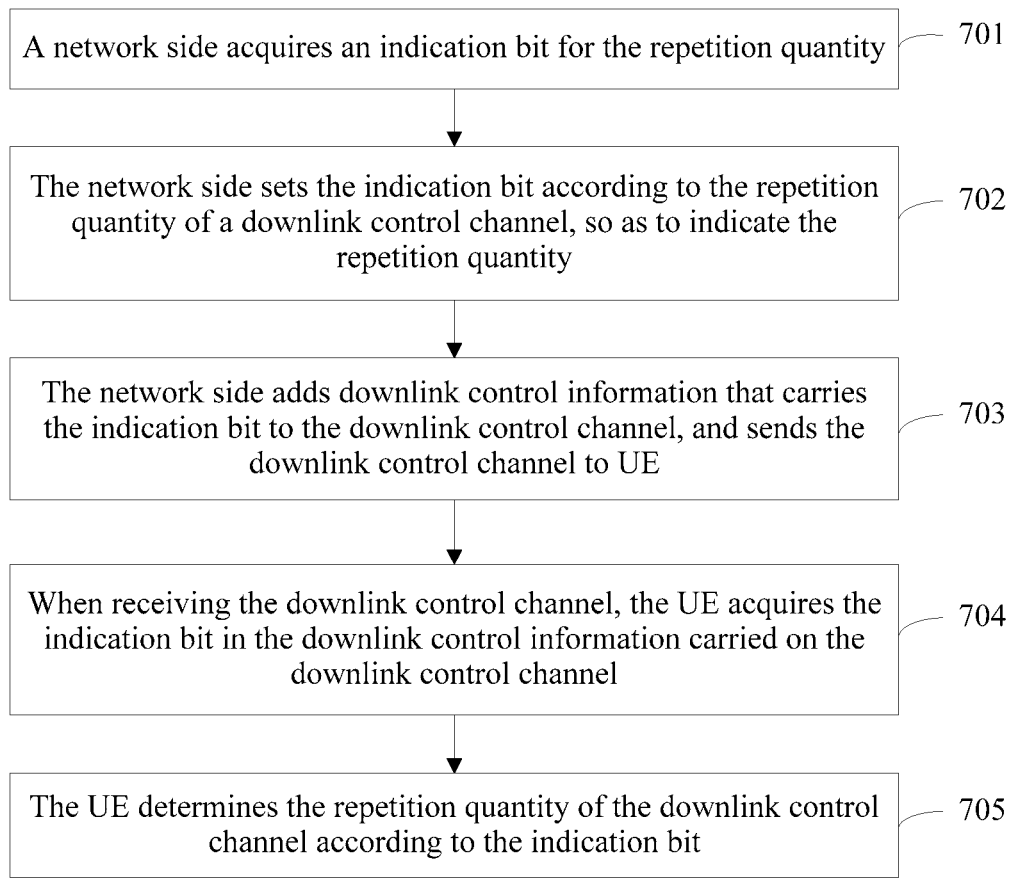
FIG. 7 is a flowchart of a method for determining a repetition quantity of a downlink control channel according to Embodiment 7 of the present invention.

FIG. 7 is a flowchart of a method for determining a repetition quantity of a downlink control channel according to an embodiment of the present invention. Referring to FIG. 7, the method includes the following steps:

Step 701. A network side acquires an indication bit for the repetition quantity.

The indication bit may be a newly added bit, or may be an existing bit. When the indication bit is an existing bit, the existing bit may be a carrier indication bit, a redundancy version indication bit, an uplink index bit, a downlink allocation bit, a channel state information request bit, or a power control command bit. The carrier indication bit includes 3 bits, the redundancy version indication bit includes 2 bits, the uplink index bit includes 2 bits, the downlink allocation bit includes 2 bits, the channel state information request bit includes 1 bit or 2 bits, and the power control command bit includes 2 bits.

When the indication bit includes 2 bits, a maximum repetition quantity that the indication bit can indicate is 4. When the indication bit includes 3 bits, the maximum repetition quantity that the indication bit can indicate is 8.

The indication bit may be used to indicate only several repetition quantities. Optionally, in this embodiment of the present invention, the indication bit may further be used to indicate a repetition level. The repetition level is determined according to the indication bit, and a corresponding repetition level is acquired according to the repetition level from a stored correspondence between the repetition quantity and the repetition level. For example, when the indication bit includes 2 bits, a maximum repetition level that the indication bit can indicate is 4, and each repetition level is corresponding to a repetition quantity. When the indication bit includes 3 bits, the maximum repetition level that the indication bit can indicate is 8, and each repetition level is corresponding to a repetition quantity.

Step 702. The network side sets the indication bit according to the repetition quantity of the downlink control channel, so as to indicate the repetition quantity.

Specifically, when the indication bit indicates a repetition quantity, the indication bit is set according to the repetition quantity. When the indication bit indicates a repetition level, the network side acquires a corresponding repetition level according to the repetition quantity of the downlink control channel from a stored correspondence between the repetition quantity and the repetition level, and sets the indication bit according to the acquired repetition level.

Step 703. The network side adds downlink control information that carries the indication bit to the downlink control channel, and sends the downlink control channel to UE.

Step 704. When receiving the downlink control channel, the UE acquires the indication bit in the downlink control information carried on the downlink control channel.

Step 705. The UE determines the repetition quantity of the downlink control channel according to the indication bit.

Specifically, when the indication bit indicates a repetition quantity, the UE acquires a corresponding repetition quantity according to a value corresponding to the indication bit from a stored correspondence between the value and the repetition quantity, and determines the acquired repetition quantity as the repetition quantity of the downlink control channel.

Further, when the indication bit indicates a repetition level, the UE acquires a corresponding repetition level according to a value corresponding to the indication bit from a stored correspondence between the value and the repetition level, determines the acquired repetition level as a repetition level of the downlink control channel, and acquires the corresponding repetition quantity according to the repetition level of the downlink control channel from a stored correspondence between the repetition level and the repetition quantity.

Further, after the UE determines the repetition quantity of the downlink control channel, the UE may further acquire a repetition quantity of a corresponding data channel according to the repetition quantity of the downlink control channel from a stored correspondence between the repetition quantity of the downlink control channel and the repetition quantity of the data channel. According to the repetition quantity of the data channel, the UE may receive a downlink data channel or send an uplink data channel.

The stored correspondence between the repetition quantity of the downlink control channel and the repetition quantity of the data channel may be a correspondence, sent by the network side, between the repetition quantity of the downlink control channel and the repetition quantity of the data channel. Certainly, the stored correspondence between the repetition quantity of the downlink control channel and the repetition quantity of the data channel may also be preset by the UE.

Optionally, the network side may acquire the repetition quantity of the data channel according to an order of the repetition quantity of the downlink control channel. That is, repetition quantities of the downlink control channel are sorted in advance, and repetition quantities of the data channel are sorted in advance, where orders of the repetition quantities of the downlink control channel and orders of the repetition quantities of the data channel are in one to one correspondence.

In this embodiment of the present invention, a repetition quantity of the downlink control channel is indicated according to an indication bit, and the indication bit is sent to UE. When the UE receives the indication bit, the UE determines the repetition quantity of the downlink control channel according to the indication bit, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 8

Figure 8:
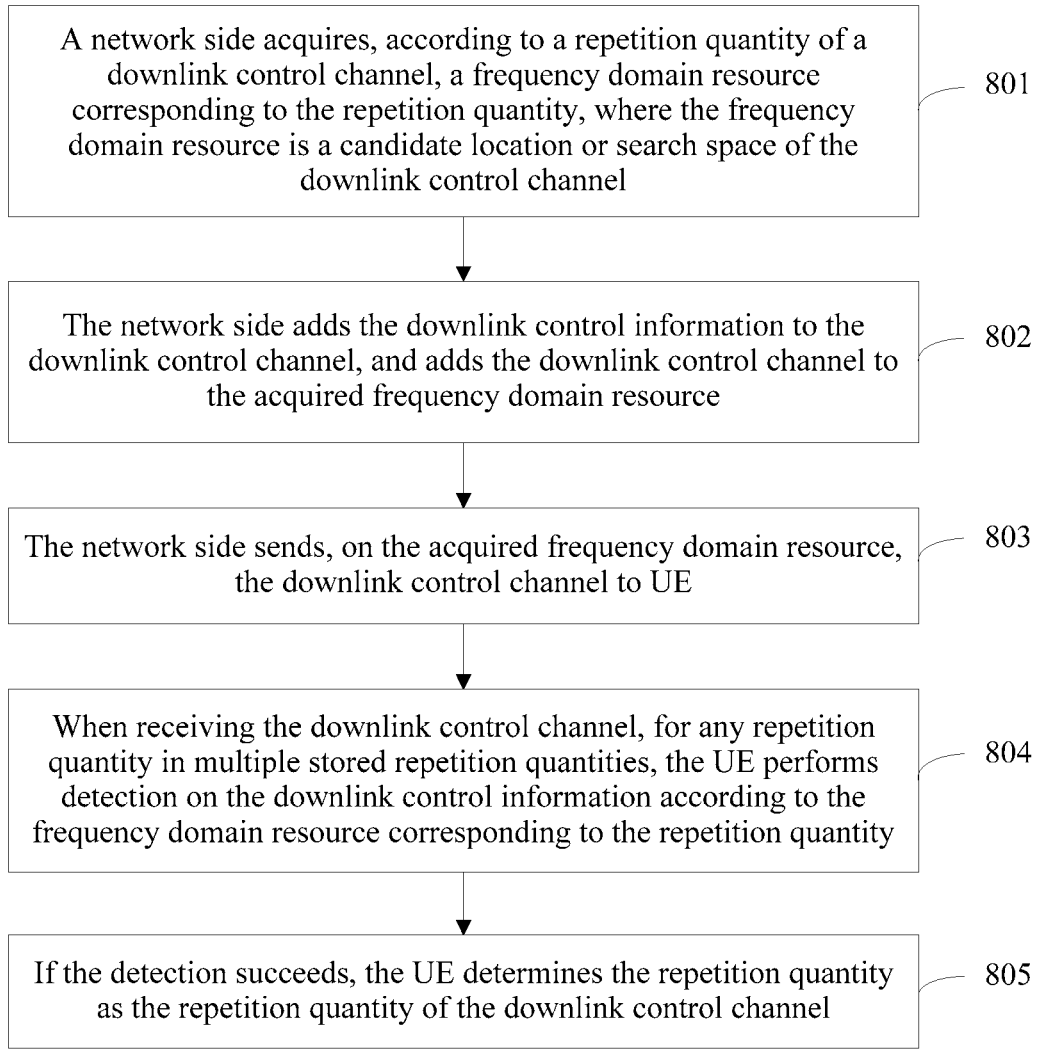
FIG. 8 is a flowchart of a method for determining a repetition quantity of a downlink control channel according to Embodiment 8 of the present invention.

FIG. 8 is a flowchart of a method for determining a repetition quantity of a downlink control channel according to an embodiment of the present invention. Referring to FIG. 8, the method includes the following steps:

Step 801. A network side acquires, according to a repetition quantity of a downlink control channel, a frequency domain resource corresponding to the repetition quantity, where the frequency domain resource is a candidate location or search space of the downlink control channel.

To avoid an ambiguity problem during detection of different repetition quantities, in this embodiment of the present invention, the downlink control channel is transmitted in a frequency division manner, that is, different repetition quantities use different frequency domain resources. In this embodiment of the present invention, different orthogonal frequency domain resources may be allocated to different repetition quantities, or frequency domain resources that have one or more overlapping parts may be allocated to different repetition quantities.

Different frequency domain resources may be different candidate locations or different search spaces. Different candidate locations may not overlap, or may overlap partially. When different candidate locations are orthogonal, the candidate locations do not overlap; when different candidate locations are partially orthogonal, the candidate locations overlap partially.

Figure 9:
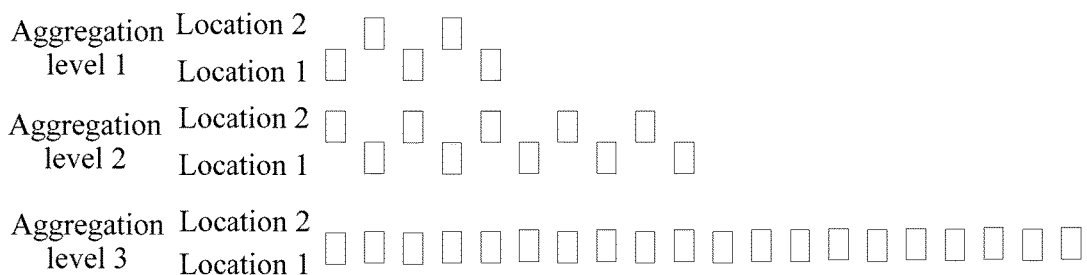
FIG. 9 is a schematic diagram of a frequency domain resource corresponding to a repetition quantity according to Embodiment 8 of the present invention.

The network side presets multiple repetition quantities for the downlink control channel, and configures a corresponding frequency domain resource for each repetition quantity. In addition, in this embodiment of the present invention, the network side may further acquire a corresponding repetition level according to the repetition quantity of the downlink control channel from a stored correspondence between the repetition quantity and the repetition level. Each repetition level is corresponding to a repetition quantity. For example, the downlink control channel includes three repetition levels: a repetition level 1, a repetition level 2, and a repetition level 3. A repetition quantity corresponding to the repetition level 1 may be 5, a repetition quantity corresponding to the repetition level 2 may be 10, and a repetition quantity corresponding to the repetition level 3 may be 20. If an aggregation level used by each of the three repetition levels is 8, a search space has only two candidate locations. Therefore, candidate locations of the three repetition levels may overlap partially, as shown in FIG. 9.

Different repetition quantities use different candidate locations or different search spaces, and different candidates may be different candidate locations in a same search space, or may be candidate locations in different search spaces. When different repetition quantities are located in different search spaces, an offset exists between the different search spaces. For example, the offset may be $r \cdot M^{(L)}$, where r is a quantity number of a repetition level, and for example, when the repetition level is a repetition level 1, r may be 1; $M^{(L)}$ is a quantity of candidate locations of the downlink control channel that need to be monitored by the UE in a search space.

The correspondence between the repetition quantity and the repetition level is preset by the network side.

In this embodiment of the present invention, the downlink control channel may be a PDCCH (Physical Downlink Control Channel, physical downlink control channel), or may be an E-PDCCH (Enhanced Physical Downlink Control Channel, enhanced physical downlink control channel).

Each repetition level is corresponding to a repetition quantity. For example, the downlink control channel includes three repetition levels: a repetition level 1, a repetition level 2, and a repetition level 3. A repetition quantity corresponding to the repetition level 1 may be 5, a repetition quantity corresponding to the repetition level 2 may be 10, and a repetition quantity corresponding to the repetition level 3 may be 20.

When the downlink control channel is a PDCCH, according to an aggregation level of a CCE (Control Channel Element, control channel element) that is used to transmit the downlink control channel, a start location parameter of a search space of the PDCCH, a quantity number of a repetition level, a quantity of candidate locations, a candidate location, and a quantity of CCEs included in a control area of a subframe, the network side calculates a number of the CCE by using the following formula (1):

$$L\{(Y_k m + r \cdot M^{(L)}) \bmod \lfloor N_{CCE,k}/L \rfloor\} + i \qquad (1)$$

In the foregoing formula (1), L is the aggregation level of the CCE that is used to transmit the downlink control channel, $Y_k$ is the start location parameter of the search space of the PDCCH, r is the quantity number of the repetition level, m is the candidate location, $M^{(L)}$ is a quantity of candidate locations of the PDCCH that need to be monitored by the UE in a given search space, mod is a modulo operation, and $N_{CCE,k}$ is a quantity of CCEs included in a control area of a subframe k, where i=0, . . . , L−1, and m=0, . . . , $M^{(L)}$−1. For $Y_k$, $Y_k=0$ in a common search space, or $Y_k=(A \cdot Y_{k-1}) \bmod D$ in a dedicated search space of the UE, where $Y_{-1}=n_{RNTI} \neq 0$; A=39827; D=65537; k=$\lfloor n_s/2 \rfloor$; $n_s$ is a timeslot number in a radio frame, and a value range of the timeslot number is 0 to 19; $n_{RNTI}$ is configured by the network side when the UE initially accesses a network, or is a preset value, or is a value generated according to a preset rule.

When the downlink control channel is an EPDCCH, according to an aggregation level of an ECCE (Enhanced Control Channel Element, enhanced control channel element) that is used to transmit the downlink control channel, a start location parameter of a search space of the EPDCCH, a quantity of candidate locations, a candidate location, and a quantity of ECCEs included in a control area of a subframe, the network side calculates a number of the ECCE by using the following formula (2):

$$L\left\{\left(Y_{p,k} + \left\lfloor \frac{m \cdot N_{ECCE,p,k}}{s \cdot L \cdot M_p^{(L)}} \right\rfloor\right) \bmod \lfloor N_{ECCE,p,k}/L \rfloor\right\} + i \qquad (2)$$

In the foregoing formula (2), L is the aggregation level of the ECCE that is used to transmit the downlink control channel, $Y_{p,k}$ is the start location parameter of the search space of the EPDCCH, m is the candidate location, s is a natural number and may be a quantity number of a repetition level, $M_p^{(L)}$ is a quantity of candidate locations of the EPDCCH that need to be monitored by the UE when an EPDCCH-PRB (Physical Resource Block, physical resource block)-set is p and the aggregation level is L, mod is a modulo operation, and $N_{ECCE,p,k}$ is a quantity of ECCEs included in the EPDCCH-PRB set p of a subframe k, where i=0, . . . , L−1, and m=0, . . . , $M_p^{(L)}$−1. $Y_{p,k}=(A_p \cdot Y_{p,k-1}) \bmod D$; where $Y_{p,-1}=n_{RNTI} \neq 0$; $A_0$=39827. $A_1$=39829; D=65537; k=$\lfloor n_s/2 \rfloor$; $n_s$ is a timeslot number in a radio frame, and a value range of the timeslot number is 0 to 19; $n_{RNTI}$ is configured by the network side when the UE initially accesses a network, or is a preset value, or is a value generated according to a preset rule.

Step 802. The network side adds the downlink control information to the downlink control channel, and adds the downlink control channel to the acquired frequency domain resource.

Step 803. The network side sends, on the acquired frequency domain resource, the downlink control channel to UE.

Step 804. When receiving the downlink control channel, for any repetition quantity in multiple stored repetition quantities, the UE performs detection on the downlink control information according to the frequency domain resource corresponding to the repetition quantity.

Specifically, when receiving the downlink control channel, for any repetition quantity in the multiple stored repetition quantities, the UE acquires the downlink control channel according to the frequency domain resource corresponding to the repetition quantity; acquires, from the acquired downlink control channel, the downlink control information and a CRC bit corresponding to the downlink control information, to obtain a bit sequence; and performs binary division on the bit sequence according to a bit corresponding to a generator polynomial to obtain a corresponding remainder, where the generator polynomial is corresponding to the CRC bit that is corresponding to the downlink control information carried on the downlink control channel. If the remainder is 0, it is determined that verification succeeds; if the remainder is not 0, it is determined that verification fails.

Step 805. If the detection succeeds, the UE determines the repetition quantity as the repetition quantity of the downlink control channel.

Further, if the verification fails, for another repetition quantity in the multiple stored repetition quantities, the foregoing steps 804 to 805 are executed to determine the repetition quantity of the downlink control channel.

Further, after the UE determines the repetition quantity of the downlink control channel, the UE may further acquire a repetition quantity of a corresponding data channel according to the repetition quantity of the downlink control channel from a stored correspondence between the repetition quantity of the downlink control channel and the repetition quantity of the data channel. According to the repetition quantity of the data channel, the UE may receive a downlink data channel or send an uplink data channel.

The stored correspondence between the repetition quantity of the downlink control channel and the repetition quantity of the data channel may be a correspondence, sent by the network side, between the repetition quantity of the downlink control channel and the repetition quantity of the data channel. Certainly, the stored correspondence between the repetition quantity of the downlink control channel and the repetition quantity of the data channel may also be preset by the UE.

Optionally, the network side may acquire the repetition quantity of the data channel according to an order of the repetition quantity of the downlink control channel. That is, repetition quantities of the downlink control channel are sorted in advance, and repetition quantities of the data channel are sorted in advance, where orders of the repetition quantities of the downlink control channel and orders of the repetition quantities of the data channel are in one to one correspondence.

In this embodiment of the present invention, different frequency domain resources are configured for different repetition quantities, and a downlink control channel is transmitted on the frequency domain resources. The UE acquires downlink control information according to a frequency domain resource corresponding to a repetition quantity, performs verification on the acquired downlink control information, and determines the repetition quantity as a repetition quantity of the downlink control channel if the verification succeeds, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 9

Figure 10:
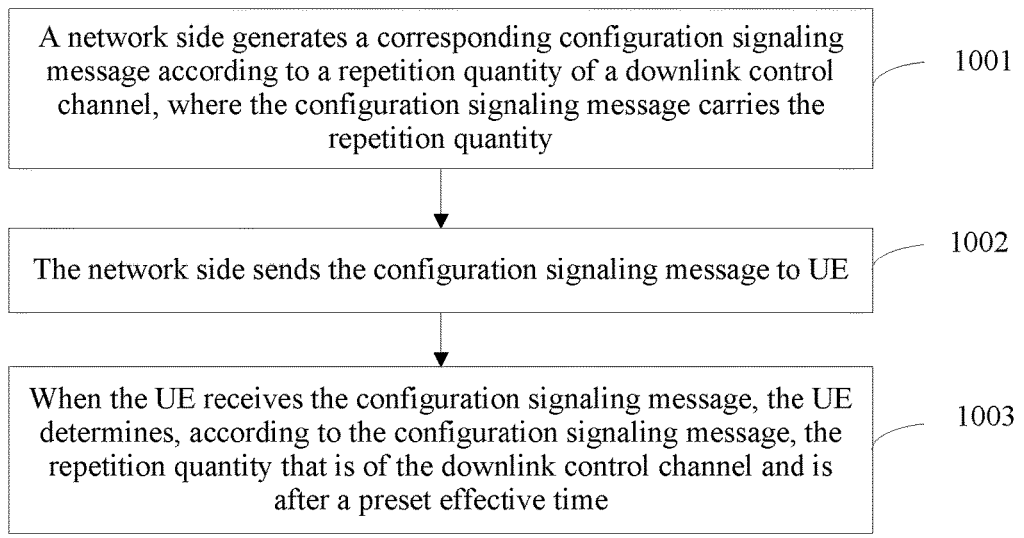
FIG. 10 is a flowchart of a method for determining a repetition quantity of a downlink control channel according to Embodiment 9 of the present invention.

FIG. 10 is a flowchart of a method for determining a repetition quantity of a downlink control channel according to an embodiment of the present invention. Referring to FIG. 10, the method includes the following steps:

Step 1001. A network side generates a corresponding configuration signaling message according to a repetition quantity of a downlink control channel, where the configuration signaling message carries the repetition quantity.

An effective time of the signaling message is preset, and the network side repeatedly transmits a PDCCH or an EPDCCH after the preset effective time, so that the UE acquires, according to the configuration signaling message, a repetition quantity of the PDCCH or the EPDCCH that is transmitted after the preset effective time.

The configuration signaling message may be an RRC (Radio Resource Control, radio resource control) message or a MAC CE (Media Access Control Channel Element, media access control element) message.

Step 1002. The network side sends the configuration signaling message to UE.

Further, when the network side sends the configuration signaling message to the UE, the network side starts timing. When the preset effective time expires, the network side adds, according to the repetition quantity, the downlink control information to the downlink control channel, and sends the downlink control channel to the UE.

Step 1003. When the UE receives the configuration signaling message, the UE determines, according to the configuration signaling message, the repetition quantity that is of the downlink control channel and is after a preset effective time.

Specifically, when the UE receives the configuration signaling message, the UE acquires the repetition quantity carried in the configuration signaling message, and determines, according to the preset effective time, the acquired repetition quantity as the repetition quantity that is of the received downlink control channel and is after the preset time.

Further, when the UE receives the configuration signaling message, the UE starts timing, and when the effective time expires, the UE determines the repetition quantity of the received downlink control channel according to the effective time.

Further, after the UE determines the repetition quantity of the downlink control channel, the UE may further acquire a repetition quantity of a corresponding data channel according to the repetition quantity of the downlink control channel from a stored correspondence between the repetition quantity of the downlink control channel and the repetition quantity of the data channel. According to the repetition quantity of the data channel, the UE may receive a downlink data channel or send an uplink data channel.

The stored correspondence between the repetition quantity of the downlink control channel and the repetition quantity of the data channel may be a correspondence, sent by the network side, between the repetition quantity of the downlink control channel and the repetition quantity of the data channel. Certainly, the stored correspondence between the repetition quantity of the downlink control channel and the repetition quantity of the data channel may also be preset by the UE.

Optionally, the network side may acquire the repetition quantity of the data channel according to an order of the repetition quantity of the downlink control channel. That is, repetition quantities of the downlink control channel are sorted in advance, and repetition quantities of the data channel are sorted in advance, where orders of the repetition quantities of the downlink control channel and orders of the repetition quantities of the data channel are in one to one correspondence.

In this embodiment of the present invention, a repetition quantity of the downlink control channel is carried in a configuration signaling message. When receiving the configuration signaling message, UE determines, according to a preset effective time, the repetition quantity that is of the received downlink control channel and is after the preset effective time, so that a repetition quantity sent by a network side is the same as a repetition quantity detected by the UE, and further the UE can successfully receive a data channel. When the UE successfully receives the data channel, the network side allocates an uplink control channel to the UE, so that an uplink control channel of another UE is not interfered when the UE sends an ACK/NACK message to the network side. After successfully receiving the data channel, the UE does not receive the data channel again, thereby reducing power consumption of the UE.

Embodiment 10

Figure 11:
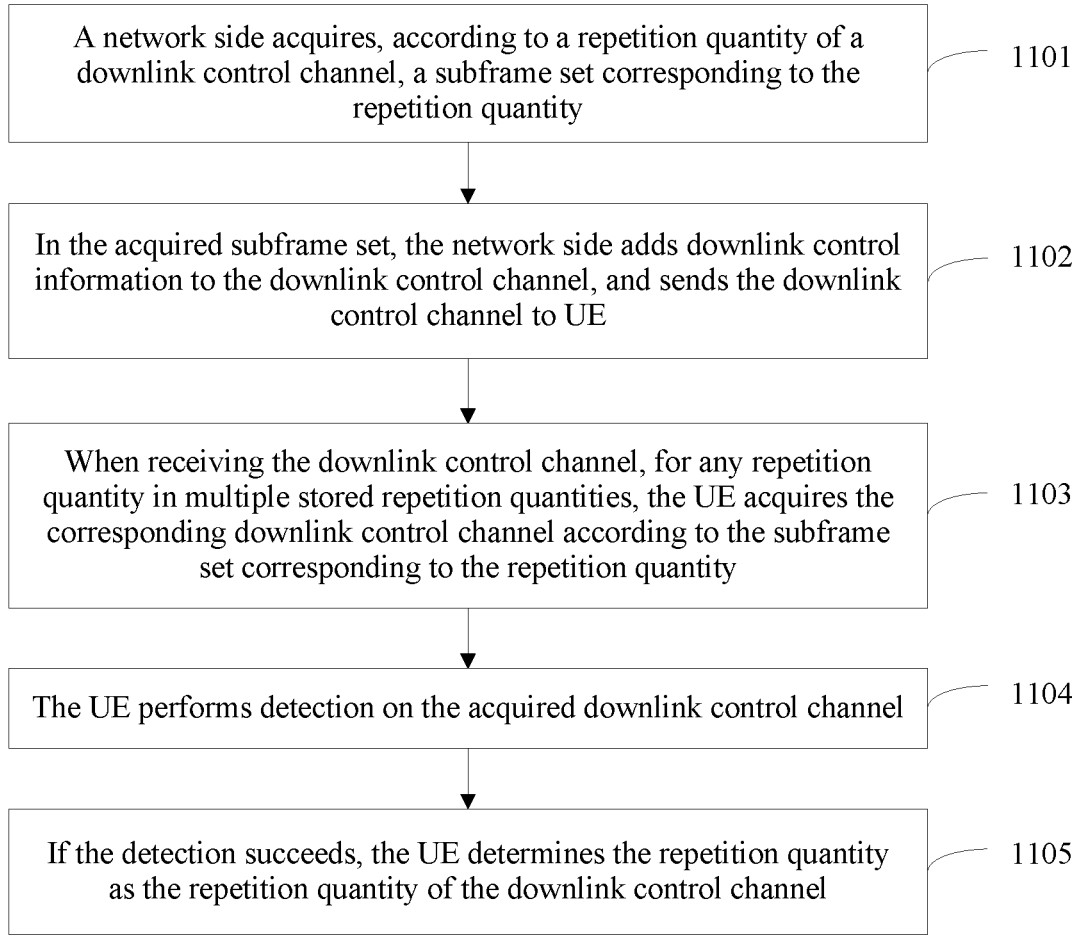
FIG. 11 is a flowchart of a method for determining a repetition quantity of a downlink control channel according to Embodiment 10 of the present invention.

FIG. 11 is a flowchart of a method for determining a repetition quantity of a downlink control channel according to an embodiment of the present invention. Referring to FIG. 11, the method includes the following steps:

Step 1101. A network side acquires, according to a repetition quantity of a downlink control channel, a subframe set corresponding to the repetition quantity.

Specifically, the network side acquires a corresponding subframe set according to the repetition quantity of the downlink control channel from a stored correspondence between the repetition quantity and the subframe set, and determines the acquired subframe set as the subframe set corresponding to the repetition quantity.

The network side may configure different subframe sets for different repetition quantities in advance, and stores a correspondence between the repetition quantities and the subframe sets. Certainly, the network side may preset a correspondence between repetition quantities and subframe sets.

When the network side configures different subframe sets for different repetition quantities, the network side sends the correspondence between the repetition quantities and the subframe sets to UE.

Optionally, in this embodiment of the present invention, the network side may further acquire a corresponding repetition level according to the repetition quantity of the downlink control channel from a stored correspondence between the repetition quantity and the repetition level, and acquire, according to the acquired repetition level, a subframe set corresponding to the repetition level.

At least one non-overlapping subframe is included in a subframe set corresponding to each repetition quantity, and the downlink control channel may be transmitted by using a candidate location that is of the downlink control channel and that is in the subframe set corresponding to the repetition quantity of the downlink control channel. The candidate location of the downlink control channel is a different candidate location, in a search space, of an aggregation level corresponding to the downlink control channel.

Figure 12:
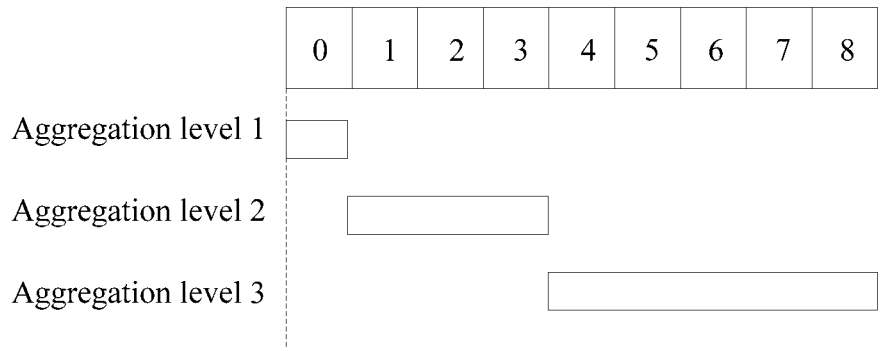
FIG. 12 is a schematic diagram of a subframe set corresponding to a repetition quantity according to Embodiment 10 of the present invention.

Further, the network side may configure or preset that a non-overlapping subframe in different repetition quantities is a start subframe for repeatedly transmitting the downlink control channel. For example, a start subframe or a reference subframe may be configured or preset for a particular repetition quantity, and a start subframe of another repetition quantity is acquired according to the start subframe or the reference subframe that is of the repetition quantity and a configured or preset offset value. The offset value indicates offset relative to the start subframe or the reference subframe that is of the repetition quantity. As shown in FIG. 12, a start subframe corresponding to a repetition level 1 is a subframe 0, and a subframe set corresponding to the repetition level 1 includes the subframe 0; a start subframe corresponding to a repetition level 2 is a subframe 1, and a subframe set corresponding to the repetition level 2 includes subframes 1, 2, and 3; a start subframe corresponding to a repetition level 3 is a subframe 4, and a subframe set corresponding to the repetition level 3 includes subframes 4, 5, 6, 7, and 8.

Figure 13:
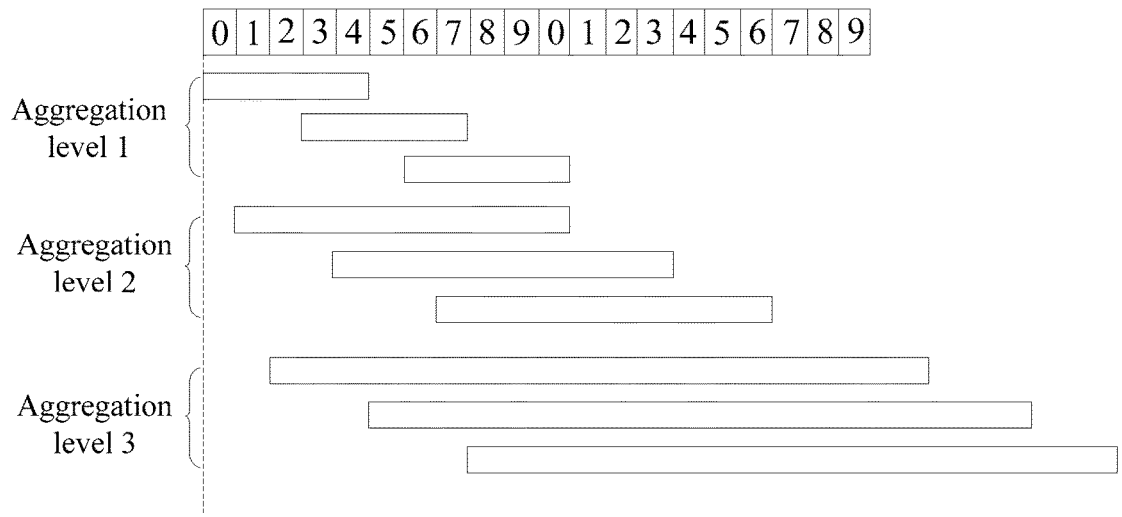
FIG. 13 is a schematic diagram of another subframe set corresponding to a repetition quantity according to Embodiment 10 of the present invention.

Optionally, the network side may further configure or preset different start subframe sets for different repetition quantities. As shown in FIG. 13, a start subframe set corresponding to a repetition level 1 includes subframes 0, 3, and 6; a subframe set corresponding to the start subframe 0 includes subframes 0, 1, 2, 3, and 4; a subframe set corresponding to the start subframe 3 includes subframes 3, 4, 5, 6, and 7; a start subframe set corresponding to the start subframe 6 includes subframes 6, 7, 8, 9, and 0. A start subframe set corresponding to a repetition level 2 includes subframes 1, 4, and 7; a subframe set corresponding to the start subframe 1 includes subframes 1, 2, 3, 4, 5, 6, 7, 8, 9, and 0; a subframe set corresponding to the start subframe 4 includes subframes 4, 5, 6, 7, 8, 9, 0, 1, 2, and 3; a start subframe set corresponding to the start subframe 7 includes subframes 7, 8, 9, 0, 1, 2, 3, 4, 5 and 6. A start subframe set corresponding to a repetition level 3 includes subframes 2, 5, and 8; a subframe set corresponding to the start subframe 2 includes subframes 2, 3, 4, 5, 6, 7, 8, 9, 0, 1, 2, 3, 4, 5, 6, 7, 8, 9, 0, and 1; a subframe set corresponding to the start subframe 5 includes subframes 5, 6, 7, 8, 9, 0, 1, 2, 3, 4, 5, 6, 7, 8, 9, 0, 1, 2, 3, and 4; a start subframe set corresponding to the start subframe 8 includes subframes 8, 9, 0, 1, 2, 3, 4, 5, 6, 7, 8, 9, 0, 1, 2, 3, 4, 5, 6, and 7.

Step 1102. In the acquired subframe set, the network side adds downlink control information to the downlink control channel, and sends the downlink control channel to UE.

Step 1103. When receiving the downlink control channel, for any repetition quantity in multiple stored repetition quantities, the UE acquires the corresponding downlink control channel according to the subframe set corresponding to the repetition quantity.

Specifically, when the UE receives the downlink control channel, for any repetition quantity in the multiple stored repetition quantities, the UE acquires the corresponding subframe set according to the repetition quantity from a store correspondence between the repetition quantity and the subframe set. The UE acquires, from the subframe set, a start subframe corresponding to the repetition quantity, and acquires the corresponding downlink control channel according to the start subframe corresponding to the repetition quantity.

Step 1104. The UE performs detection on the acquired downlink control channel.

Specifically, the UE acquires, from the acquired downlink control channel, the downlink control information and a CRC bit corresponding to the downlink control information, to obtain a bit sequence, and performs binary division on the bit sequence according to a bit corresponding to a generator polynomial to obtain a corresponding remainder, where the generator polynomial is corresponding to the CRC bit that is corresponding to the downlink control information carried on the downlink control channel. If the remainder is 0, it is determined that verification succeeds; if the remainder is not 0, it is determined that verification fails.

Step 1105. If the detection succeeds, the UE determines the repetition quantity as the repetition quantity of the downlink control channel.

Further, after the UE determines the repetition quantity of the downlink control channel, the UE may further acquire a repetition quantity of a corresponding data channel according to the repetition quantity of the downlink control channel from a stored correspondence between the repetition quantity of the downlink control channel and the repetition quantity of the data channel. According to the repetition quantity of the data channel, the UE may receive a downlink data channel or send an uplink data channel.

The stored correspondence between the repetition quantity of the downlink control channel and the repetition quantity of the data channel may be a correspondence, sent by the network side after the network side configures the repetition quantity of the data channel according to the repetition quantity of the downlink control channel, between the repetition quantity of the downlink control channel and the repetition quantity of the data channel. Certainly, the stored correspondence between the repetition quantity of the downlink control channel and the repetition quantity of the data channel may also be preset by the UE.

Optionally, the network side may acquire the repetition quantity of the data channel according to an order of the repetition quantity of the downlink control channel. That is, repetition quantities of the downlink control channel are sorted in advance, and repetition quantities of the data channel are sorted in advance, where orders of the repetition quantities of the downlink control channel and orders of the repetition quantities of the data channel are in one to one correspondence.

In this embodiment of the present invention, different subframe sets are configured for different repetition quantities, and a non-overlapping subframe in the subframe set is determined as a start subframe of the repetition quantity. The UE may receive a downlink control channel according to a subframe set corresponding to a repetition quantity, and further determines a repetition quantity of the downlink control channel, so that a repetition quantity sent by a network side is the same as a repetition quantity detected by the UE, and further the UE can successfully receive a data channel. When the UE successfully receives the data channel, the network side allocates an uplink control channel to the UE, so that an uplink control channel of another UE is not interfered when the UE sends an ACK/NACK message to the network side. After successfully receiving the data channel, the UE does not receive the data channel again, thereby reducing power consumption of the UE.

Optionally, in another embodiment of the present invention, the repetition quantity of the downlink control channel may be determined by performing detection in an order from a maximum repetition quantity to a minimum repetition quantity, so as to avoid an ambiguity problem during detection of different repetition quantities of the downlink control channel.

Embodiment 11

Figure 14:
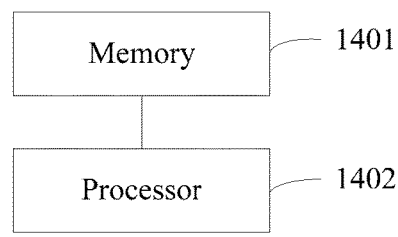
FIG. 14 is a schematic structural diagram of an apparatus for determining a repetition quantity of a downlink control channel according to Embodiment 11 of the present invention.

FIG. 14 shows an apparatus for determining a repetition quantity of a downlink control channel according to an embodiment of the present invention. Referring to FIG. 14, the apparatus includes a memory 1401 and a processor 1402, and is used to perform the following method for determining a repetition quantity of a downlink control channel, where the method includes:

acquiring processing information corresponding to a repetition quantity of a downlink control channel; and sending the downlink control channel to user equipment UE according to the processing information, where the downlink control channel is used to carry processed downlink control information, so that the UE determines the repetition quantity of the downlink control channel according to the processing information.

Optionally, the acquiring processing information corresponding to a repetition quantity of a downlink control channel includes:

acquiring a corresponding mask according to the repetition quantity of the downlink control channel.

Optionally, the sending the downlink control channel to user equipment UE according to the processing information includes:

connecting, in series behind downlink control information carried on the downlink control channel, a cyclic redundancy check code CRC bit corresponding to the downlink control information to obtain a bit sequence;

performing, according to the mask and a radio network temporary identifier RNTI of the UE, scrambling on the CRC bit corresponding to the downlink control information carried on the downlink control channel, to obtain the processed downlink control information; and adding the processed downlink control information to the downlink control channel, and sending the downlink control channel to the UE.

The method further includes:

acquiring an antenna selection mask when antenna selection is configured.

Correspondingly, the performing, according to the mask and a radio network temporary identifier RNTI of the UE, scrambling on the CRC bit corresponding to the downlink control information carried on the downlink control channel, to obtain the processed downlink control information includes:

performing, according to the mask, the antenna selection mask, and the RNTI, scrambling on the CRC bit corresponding to the downlink control information carried on the downlink control channel, to obtain the processed downlink control information.

Optionally, the acquiring processing information corresponding to a repetition quantity of a downlink control channel includes:

acquiring a scrambling initialization parameter corresponding to the repetition quantity of the downlink control channel;

acquiring a number of a timeslot in which the downlink control channel is currently located and an identity ID value acquired by a network side; and initializing a sequence generator according to the scrambling initialization parameter, the number of the timeslot in which the downlink control channel is currently located, and the ID value acquired by the network side, so that the sequence generator generates a scrambling sequence.

Optionally, before the sending the downlink control channel to user equipment UE according to the processing information, the method further includes:

connecting a CRC bit in series behind downlink control information to obtain a bit sequence;

performing channel coding on the bit sequence to obtain a coded block; and performing rate matching processing on the coded block to obtain a rate matching bit.

Optionally, the sending the downlink control channel to user equipment UE according to the processing information includes:

performing scrambling on the rate matching bit according to the scrambling sequence generated by the sequence generator, to obtain the processed downlink control information; and adding the processed downlink control information to the downlink control channel, and sending the downlink control channel to the UE.

Further, the method further includes:

performing scrambling and modulation on the rate matching bit to obtain a modulation symbol.

Correspondingly, the sending the downlink control channel to user equipment UE according to the processing information includes:

multiplying, bit by bit, the modulation symbol and a scrambling sequence corresponding to the repetition quantity, to obtain the processed downlink control information; and adding the processed downlink control information to the downlink control channel, and sending the downlink control channel to the UE.

The acquiring processing information corresponding to a repetition quantity of a downlink control channel includes:

acquiring an indication bit for the repetition quantity of the downlink control channel; and setting the indication bit according to the repetition quantity of the downlink control channel, so as to indicate the repetition quantity.

The indication bit is a newly added bit or an existing bit.

Optionally, the acquiring processing information corresponding to a repetition quantity of a downlink control channel includes:

acquiring a frequency domain resource corresponding to the repetition quantity, where the frequency domain resource is a candidate location or search space of the control channel.

Optionally, the sending the downlink control channel to user equipment UE according to the processing information includes:

adding the downlink control information to the downlink control channel, and adding the downlink control channel to the frequency domain resource; and sending the downlink control channel to the UE on the frequency domain resource.

Optionally, the sending the downlink control channel to user equipment UE according to the processing information includes:

sending a configuration signaling message to the UE, so that the UE determines, according to the configuration signaling message, the repetition quantity that is after a preset effective time; and adding the downlink control information to the downlink control channel according to the repetition quantity, and sending the downlink control channel to the UE after the preset effective time expires.

The configuration signaling message is a radio resource control RRC message or a media access control element MAC CE message.

Optionally, the acquiring processing information corresponding to a repetition quantity of a downlink control channel includes:

acquiring, according to the repetition quantity of the downlink control channel, a subframe set corresponding to the repetition quantity.

Optionally, the sending the downlink control channel to user equipment UE according to the processing information includes:

in the subframe set corresponding to the repetition quantity, adding the downlink control information to the downlink control channel, and sending the downlink control channel to the UE.

Subframe sets corresponding to multiple repetition quantities include at least one non-overlapping subframe.

Further, the method further includes:

configuring a correspondence between the repetition quantity of the downlink control channel and a repetition quantity of a data channel, and sending, to the UE, the correspondence between the repetition quantity of the downlink control channel and the repetition quantity of the data channel; or presetting a correspondence between the repetition quantity of the downlink control channel and a repetition quantity of a data channel.

Further, the method further includes:

acquiring the repetition quantity of the corresponding data channel according to the repetition quantity of the downlink control channel from the correspondence between the repetition quantity of the downlink control channel and the repetition quantity of the data channel; and according to the repetition quantity of the data channel, sending a downlink data channel or receiving an uplink data channel.

In this embodiment of the present invention, processing information corresponding to a repetition quantity of a downlink control channel is acquired, and the downlink control channel is sent to UE according to the processing information. According to the received downlink control channel, the UE determines the repetition quantity of the downlink control channel, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

Embodiment 12

Figure 15:
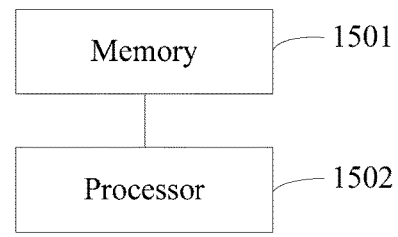
FIG. 15 is a schematic structural diagram of an apparatus for determining a repetition quantity of a downlink control channel according to Embodiment 12 of the present invention.

FIG. 15 is a schematic structural diagram of an apparatus for determining a repetition quantity of a downlink control channel according to an embodiment of the present invention. Referring to FIG. 15, the apparatus includes a memory 1501 and a processor 1502, and is used to perform the following method for determining a repetition quantity of a downlink control channel, where the method includes:

receiving a downlink control channel, where the downlink control channel is used to carry processed downlink control information, and the downlink control information is sent by a network side according to processing information corresponding to a repetition quantity of the downlink control channel; and determining the repetition quantity of the downlink control channel according to the downlink control channel.

Optionally, the determining the repetition quantity of the downlink control channel according to the downlink control channel includes:

for any repetition quantity in multiple stored repetition quantities, performing, according to a scrambling sequence corresponding to the repetition quantity, descrambling on the processed downlink control information carried on the downlink control channel;

performing verification on descrambled downlink control information according to a cyclic redundancy check CRC bit corresponding to downlink control information carried on the downlink control channel; and if the verification succeeds, determining the repetition quantity as the repetition quantity of the downlink control channel.

Optionally, the performing, according to a scrambling sequence corresponding to the repetition quantity, descrambling on the processed downlink control information carried on the downlink control channel includes:

performing, according to a mask corresponding to the repetition quantity and a radio network temporary identifier RNTI of user equipment UE, descrambling on a scrambled CRC bit in the processed downlink control information carried on the downlink control channel.

When antenna selection is configured, the performing, according to a mask corresponding to the repetition quantity and a radio network temporary identifier RNTI of user equipment UE, descrambling on a scrambled CRC bit in the processed downlink control information carried on the downlink control channel includes:

performing, according to the mask corresponding to the repetition quantity, an antenna selection mask, and the RNTI, descrambling on the scrambled CRC bit in the processed downlink control information carried on the downlink control channel.

Optionally, the performing, according to a scrambling sequence corresponding to the repetition quantity, descrambling on the processed downlink control information carried on the downlink control channel includes:

initializing a sequence generator according to a scrambling initialization parameter corresponding to the repetition quantity, a number of a timeslot in which the downlink control channel is currently located, and an identity ID value acquired by the UE, so that the sequence generator generates a scrambling sequence; and performing, according to the scrambling sequence generated by the sequence generator, descrambling on the processed downlink control information carried on the downlink control channel.

Optionally, the performing, according to a scrambling sequence corresponding to the repetition quantity, descrambling on the processed downlink control information carried on the downlink control channel includes:

multiplying, bit by bit, a symbol corresponding to the processed downlink control information carried on the downlink control channel and the scrambling sequence corresponding to the repetition quantity, to obtain the descrambled downlink control information.

Optionally, the determining the repetition quantity of the downlink control channel according to the downlink control channel includes:

acquiring an indication bit in the downlink control information carried on the downlink channel; and determining the repetition quantity of the downlink control channel according to the indication bit.

The indication bit is a newly added bit or an existing bit.

Optionally, the determining the repetition quantity of the downlink control channel according to the downlink control channel includes:

for any repetition quantity in multiple stored repetition quantities, performing detection on the downlink control channel according to a frequency domain resource corresponding to the repetition quantity, where the frequency domain resource is a candidate location or search space of the downlink control channel; and if the detection succeeds, determining the repetition quantity as the repetition quantity of the downlink control channel.

When different repetition quantities are located in different search spaces, an offset exists between adjacent search spaces.

Optionally, the determining the repetition quantity of the downlink control channel according to the downlink control channel includes:

receiving a configuration signaling message; and determining that a repetition quantity carried in the configuration signaling message is the repetition quantity that is of the downlink control channel and is after a preset effective time.

The configuration signaling message is a radio resource control RRC message or a media access control element MAC CE message.

Optionally, the determining the repetition quantity of the downlink control channel according to the downlink control channel includes:

for any repetition quantity in multiple stored repetition quantities, acquiring the corresponding downlink control channel according to a subframe set corresponding to the repetition quantity;

performing detection on the acquired downlink control channel; and if the detection succeeds, determining the repetition quantity as the repetition quantity of the downlink control channel.

Subframe sets corresponding to the multiple repetition quantities include at least one non-overlapping subframe.

Further, the method further includes:

acquiring a repetition quantity of a data channel according to the repetition quantity of the downlink control channel from a stored correspondence between the repetition quantity of the downlink control channel and the repetition quantity of the data channel; and according to the repetition quantity of the data channel, receiving a downlink data channel or sending an uplink data channel.

Further, before the acquiring a repetition quantity of a data channel according to the repetition quantity of the downlink control channel from a stored correspondence between the repetition quantity of the downlink control channel and the repetition quantity of the data channel, the method further includes:

receiving the correspondence between the repetition quantity of the downlink control channel and the repetition quantity of the data channel.

In this embodiment of the present invention, processing information corresponding to a repetition quantity of a downlink control channel is acquired, and the downlink control channel is sent to UE according to the processing information. According to the received downlink control channel, the UE determines the repetition quantity of the downlink control channel, so that a repetition quantity sent by a network side is the same as a repetition quantity detected by the UE, and further the UE can successfully receive a data channel. When the UE successfully receives the data channel, an uplink control channel of another UE is not interfered when the UE sends an ACK/NACK message to the network side according to an allocated uplink control resource. After successfully receiving the data channel, the UE does not receive the data channel again, thereby reducing power consumption of the UE and resource consumption.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. An apparatus for determining a repetition quantity of a downlink control channel, wherein the apparatus comprises:
    a receiver, configured to receive downlink control information carried on a downlink control channel, wherein the downlink control information is processed by a parameter corresponding to a repetition quantity of the downlink control channel; and
    a processor, configured to:
    determine the repetition quantity of the downlink control channel according to the downlink control information;
    for any repetition quantity in multiple stored repetition quantities, perform, according to a scrambling sequence corresponding to the repetition quantity, descrambling on the processed downlink control information carried on the downlink control channel;
    perform verification on the descrambled downlink control information according to cyclic redundancy check (CRC) bits corresponding to the downlink control information carried on the downlink control channel;
    determine the repetition quantity as the repetition quantity of the downlink control channel in a case that the verification succeeds; and
    perform, according to a mask corresponding to the repetition quantity, an antenna selection mask, and a radio network temporary identifier (RNTI), descrambling on the scrambled CRC bits in the processed downlink control information carried on the downlink control channel.

2. The apparatus according to claim 1, wherein the processor is further configured to:
    multiply, bit by bit, a symbol corresponding to the processed downlink control information carried on the downlink control channel and the scrambling sequence corresponding to the repetition quantity, to obtain the descrambled downlink control information.

3. The apparatus according to claim 1, wherein the processor is further configured to:
    for any repetition quantity in multiple stored repetition quantities, acquire the corresponding downlink control channel according to a subframe set corresponding to the repetition quantity;
    perform detection on the acquired downlink control channel; and
    if the detection succeeds, determine the repetition quantity as the repetition quantity of the downlink control channel.

4. The apparatus according to claim 3, wherein subframe sets corresponding to the multiple stored repetition quantities comprise at least one non-overlapping subframe.

5. The apparatus according to claim 1, wherein the processor is further configured to:
    acquire a repetition quantity of a data channel according to the repetition quantity of the downlink control channel from a stored correspondence between the repetition quantity of the downlink control channel and the repetition quantity of the data channel; and
    perform data transmission according to the repetition quantity of the data channel.

6. The apparatus according to claim 5, wherein the receiver is configured to:
    receive the stored correspondence between the repetition quantity of the downlink control channel and the repetition quantity of the data channel.

7. A method for determining a repetition quantity of a downlink control channel, wherein the method comprises:
    receiving downlink control information carried on a downlink control channel, wherein the downlink control information is processed by a parameter corresponding to a repetition quantity of the downlink control channel; and
    determining the repetition quantity of the downlink control channel according to the downlink control information;
    wherein the determining the repetition quantity of the downlink control channel according to the downlink control information comprises:
    for any repetition quantity in multiple stored repetition quantities, performing, according to a scrambling sequence corresponding to the repetition quantity, descrambling on the processed downlink control information carried on the downlink control channel;
    performing verification on the descrambled downlink control information according to cyclic redundancy check (CRC) bits corresponding to the downlink control information carried on the downlink control channel; and
    if the verification succeeds, determining the repetition quantity as the repetition quantity of the downlink control channel;
    wherein the performing, according to a scrambling sequence corresponding to the repetition quantity, descrambling on the processed downlink control information carried on the downlink control channel comprises:
    performing, according to a mask corresponding to the repetition quantity, an antenna selection mask, and a radio network temporary identifier (RNTI), descrambling on the scrambled CRC bits in the processed downlink control information carried on the downlink control channel.

8. The method according to claim 7, wherein the performing, according to the scrambling sequence corresponding to the repetition quantity, descrambling on the processed downlink control information carried on the downlink control channel comprises:
    multiplying, bit by bit, a symbol corresponding to the processed downlink control information carried on the downlink control channel and a scrambling sequence corresponding to the repetition quantity, to obtain the descrambled downlink control information.

9. The method according to claim 7, wherein the determining the repetition quantity of the downlink control channel according to the downlink control information comprises:
    for any repetition quantity in multiple stored repetition quantities, acquiring the corresponding downlink control channel according to a subframe set corresponding to the repetition quantity;
    performing detection on the acquired downlink control channel; and
    if the detection succeeds, determining the repetition quantity as the repetition quantity of the downlink control channel.

10. The method according to claim 9, wherein subframe sets corresponding to the multiple stored repetition quantities comprise at least one non-overlapping subframe.

11. The method according to claim 7, wherein the method further comprises:
    acquiring a repetition quantity of a data channel according to the repetition quantity of the downlink control channel from a stored correspondence between the repetition quantity of the downlink control channel and the repetition quantity of the data channel; and according to the repetition quantity of the data channel, receiving a downlink data channel or sending an uplink data channel.

12. The method according to claim 11, wherein before the acquiring a repetition quantity of a data channel according to the repetition quantity of the downlink control channel from a stored correspondence between the repetition quantity of the downlink control channel and the repetition quantity of the data channel, further comprising:

receiving the stored correspondence between the repetition quantity of the downlink control channel and the repetition quantity of the data channel.

* * * * *